United States Patent
Sampedro et al.

(10) Patent No.: US 10,131,053 B1
(45) Date of Patent: Nov. 20, 2018

(54) REAL TIME ROBOT COLLISION AVOIDANCE

(71) Applicant: X Development LLC, Mountain View, CA (US)

(72) Inventors: Peter Pastor Sampedro, San Francisco, CA (US); Umashankar Nagarajan, Santa Clara, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 136 days.

(21) Appl. No.: 15/265,547

(22) Filed: Sep. 14, 2016

(51) Int. Cl.
*B25J 9/00* (2006.01)
*B25J 9/16* (2006.01)

(52) U.S. Cl.
CPC ... *B25J 9/1666* (2013.01); *G05B 2219/40476* (2013.01)

(58) Field of Classification Search
USPC .................................................. 700/245–264
See application file for complete search history.

(56) References Cited

U.S. PATENT DOCUMENTS

| | | | | |
|---|---|---|---|---|
| 3,920,972 A * | 11/1975 | Corwin, Jr. | .......... | G05B 19/425 700/251 |
| 5,161,936 A * | 11/1992 | Kato | ...................... | B25J 9/0084 414/728 |
| 5,438,647 A * | 8/1995 | Nagamatsu | ............ | B25J 9/0084 700/247 |
| 5,548,694 A * | 8/1996 | Frisken Gibson | ...... | G06T 15/10 345/424 |
| 5,561,742 A * | 10/1996 | Terada | ................... | B25J 9/1669 700/249 |
| 6,004,016 A * | 12/1999 | Spector | .................. | B25J 9/1666 700/247 |
| 6,318,951 B1 * | 11/2001 | Schmidt | ..................... | B25J 5/02 414/744.5 |
| 7,042,185 B2 * | 5/2006 | Yang | ..................... | B25J 9/1648 318/567 |
| 7,622,158 B2 * | 11/2009 | Clifford | ............... | B05B 12/149 427/427.2 |

(Continued)

OTHER PUBLICATIONS

Mitsch et al. "On provably safe obstacle avoidance for autonomous robotic ground vehicles." (2013) 8 pages.

(Continued)

*Primary Examiner* — Jonathan L Sample
(74) *Attorney, Agent, or Firm* — Middleton Reutlinger

(57) ABSTRACT

Methods and apparatus related to robot collision avoidance. One method may include: receiving robot instructions to be performed by a robot; at each of a plurality of control cycles of processor(s) of the robot: receiving trajectories to be implemented by actuators of the robot, wherein the trajectories define motion states for the actuators of the robot during the control cycle or a next control cycle, and wherein the trajectories are generated based on the robot instructions; determining, based on a current motion state of the actuators and the trajectories to be implemented, whether implementation of the trajectories by the actuators prevents any collision avoidance trajectory from being achieved; and selectively providing the trajectories or collision avoidance trajectories for operating the actuators of the robot during the control cycle or the next control cycle depending on a result of the determining.

16 Claims, 9 Drawing Sheets

(56) References Cited

U.S. PATENT DOCUMENTS

| | | | | |
|---|---|---|---|---|
| 7,765,031 | B2* | 7/2010 | Nagamatsu | B25J 9/1666 318/568.11 |
| 7,813,830 | B2* | 10/2010 | Summers | G05B 19/4015 234/13 |
| 8,095,238 | B2 | 1/2012 | Jones et al. | |
| 8,315,738 | B2* | 11/2012 | Chang | B25J 9/1666 700/248 |
| 8,340,820 | B2* | 12/2012 | Nair | B25J 9/1666 700/255 |
| 8,706,394 | B2 | 4/2014 | Trepagnier et al. | |
| 9,233,470 | B1* | 1/2016 | Bradski | B25J 9/163 |
| 9,643,316 | B2* | 5/2017 | Krasny | B25J 9/1666 |
| 2003/0100957 | A1* | 5/2003 | Chaffee | G05B 19/042 700/18 |
| 2003/0109780 | A1* | 6/2003 | Coste-Maniere | B25J 9/1671 600/407 |
| 2003/0225479 | A1* | 12/2003 | Waled | B25J 9/161 700/245 |
| 2004/0001750 | A1* | 1/2004 | Kremerman | B25J 9/042 414/744.1 |
| 2005/0166413 | A1* | 8/2005 | Crampton | B25J 13/088 33/503 |
| 2005/0179416 | A1* | 8/2005 | Iribe | B25J 9/1674 318/563 |
| 2005/0273200 | A1* | 12/2005 | Hietmann | B25J 9/1666 700/248 |
| 2006/0130750 | A1* | 6/2006 | Ishikawa | G03B 27/32 118/300 |
| 2006/0167587 | A1* | 7/2006 | Read | B23Q 9/00 700/245 |
| 2007/0118249 | A1* | 5/2007 | Nagamatsu | B25J 9/1666 700/248 |
| 2007/0144439 | A1* | 6/2007 | Englhardt | G03F 7/70991 118/719 |
| 2007/0147982 | A1* | 6/2007 | Rice | H01L 21/67173 414/800 |
| 2008/0231221 | A1* | 9/2008 | Ogawa | B25J 5/007 318/568.12 |
| 2008/0319557 | A1* | 12/2008 | Summers | G05B 19/4015 700/19 |
| 2009/0070936 | A1* | 3/2009 | Henderson | A61B 6/0457 5/601 |
| 2009/0204258 | A1* | 8/2009 | Tao | B25J 9/1674 700/248 |
| 2010/0230511 | A1* | 9/2010 | Umezawa | B05B 5/1675 239/104 |
| 2011/0071675 | A1* | 3/2011 | Wells | G06K 9/3216 700/250 |
| 2012/0165979 | A1* | 6/2012 | Lim | B25J 9/162 700/253 |
| 2012/0215351 | A1* | 8/2012 | McGee | B25J 9/1666 700/248 |
| 2012/0215354 | A1* | 8/2012 | Krasny | B25J 9/1666 700/255 |
| 2013/0345872 | A1* | 12/2013 | Brooks | B25J 9/0087 700/259 |
| 2014/0163736 | A1* | 6/2014 | Azizian | A61B 19/2203 700/259 |
| 2015/0081200 | A1* | 3/2015 | Wang | G08G 1/16 701/301 |
| 2015/0127150 | A1* | 5/2015 | Ponulak | B25J 9/163 700/250 |
| 2016/0000511 | A1* | 1/2016 | Hoffmann | B25J 9/1664 606/130 |
| 2016/0073978 | A1* | 3/2016 | Henderson | A61B 6/0457 5/600 |
| 2016/0158936 | A1* | 6/2016 | Moridaira | B25J 9/1666 700/255 |

OTHER PUBLICATIONS

Zeng et al. "Mobile robot collision avoidance in human environments." International Journal of Advanced Robotic Systems 10 (2013). 14 pages.

Rodriguez-Seda et al. "Trajectory tracking with collision avoidance for nonholonomic vehicles with acceleration constraints and limited sensing." The International Journal of Robotics Research 33.12 (2014): 1569-1592.

Lagoudakis, Michail G. "Incremental Multi-Objective Motion Control of Nonholonomic Mobile Robots." In 2006 IEEE/RSJ International Conference on Intelligent Robots and Systems, pp. 2804-2809. IEEE, 2006.

De Luca et al. "Local incremental planning for nonholonomic mobile robots." In Robotics and Automation, 1994. Proceedings., 1994 IEEE International Conference on, pp. 104-110. IEEE, 1994.

* cited by examiner

REAL TIME ROBOT COLLISION AVOIDANCE

BACKGROUND

Robots can be configured to perform a variety of functions. For example, a robot can be configured to utilize one or more end effectors to grasp objects, open doors, clean a surface, etc. One way a robot may be operated is by utilizing various forms of robot instructions. As one example, humans may utilize various programming environments (e.g., text based, graphical based) to create source code that dictates at least some operations of a robot. The source code can be compiled into object code, which may be executed by one or more processors of the robot to control one or more operations of the robot. As another example, neural network models can be trained based on training data and utilized in the control of one or more operations of the robot. Robot instructions may be provided by entities such as third party developers or end users that may not have determined, and/or may wish to determine, how the robot will behave when controlled based on the robot instructions. For example, they may wish to determine error conditions that may result from operation of the robot based on the robot instructions, whether the robot instructions will cause a robot to damage itself and/or its environment, etc.

SUMMARY

The present disclosure is directed to methods, systems, and apparatus for robot collision detection and avoidance. In some implementations, for each iteration of a plurality of control cycles of a robot, it may be determined, in conjunction with implementing robot instructions that are potentially untested and/or unpredictable, whether any collision avoidance trajectories associated with the robot's actuators are prevented from being achieved in a future iteration of the plurality of control cycles. In response to this determination, one or more actuators of the robot may be operated to selectively implement either trajectories generated based on the robot instructions or collision avoidance trajectories.

Implementing collision avoidance trajectories may avoid/prevent/minimize damage to the robot and/or its environment caused by collisions between the robot and itself/its environment. This may be beneficial, for example, when testing robot instructions that may otherwise inadvertently cause the robot to cause damage to the environment and/or itself. In some implementations, collisions may be between an actual robot and actual objects and/or surfaces. In other implementations, collisions may be between an actual or simulated (e.g., "virtual") robot and simulated objects and/or surfaces (e.g., virtual "walls" or other virtual boundaries). And of course, some collisions may be permitted, e.g., when robot instructions are meant to cause the robot to make physical contact with an environmental object and/or surface, e.g., to manipulate the object/surface. In such scenarios, objects intended to be interacted with by the robot may be designated as "safe," "safe under one or more conditions," etc.

The robot instructions may take various forms such as source code, object code, and/or other instructions that may be executed by a robot (optionally after compiling or other processing). For example, the robot instructions may be provided as object code that can be executed directly by one or more processors of each of a plurality of testing robots. As another example, the instructions may be provided as source code that must first be compiled before being executed by the testing robots. As yet another example, the instructions may be provided as a state machine or other data structure that may be implemented by the testing robots in real-time.

In various implementations, collision avoidance trajectories may take various forms. In some implementations, collision avoidance trajectories may take the form of safe stopping trajectories achievable by actuators of the robot. In some of those implementations, safe stopping trajectories are trajectories that can be achieved without requiring active braking of actuator(s) and/or without violating constraint(s) of the actuators. As one example, safe stopping trajectories achievable by robot actuators may be determined at each iteration of the plurality of control cycles of the robot while the robot performs the robot instructions. Data indicative of the safe stopping trajectories may be persisted temporarily, e.g., at least long enough to project a future motion state of the robot during a subsequent iteration of the plurality of control cycles. In the event that it is determined that any safe stopping trajectories are prevented from being achieved in a future iteration, the robot can be operated to implement the persisted safe stopping trajectories. This may ensure that the robot avoids the collision or at least attempts to avoid the collision. In other implementations, collision avoidance trajectories may take the form of alternative trajectories traversable by one or more actuators of the robot to achieve a task associated with the robot instructions.

In some implementations, techniques described herein may be employed when operating each of a plurality of testing robots based on the robot instructions. For example, the techniques may be employed for each of the testing robots to minimize (or prevent) the testing robots from experiencing collisions with themselves and/or with real or virtual objects in their environments. In some implementations, data generated by the testing robots during the operation of the testing robots based on the robot instructions may be stored in one or more computer readable media. The stored data may be used for various purposes such as analysis of performance of the robot instructions (e.g., to determine error conditions, performance issues, collision issues), modification of the robot instructions, and/or to generate training examples for training of a neural network model. The generated data may include, for example, sensor data from one or more sensors of the robot (e.g., video/images from vision sensors, force sensors, position sensors, tactile sensors) and/or data that indicates error condition(s) encountered during operation of the robot (e.g., due to erroneous robot instructions, due to robot instructions causing operational and/or safety limits to be exceeded, due to robot collisions caused by operating the robot based on the robot instructions, etc.).

In some implementations, information based on the stored data generated by the testing robots is provided in response to a request. The information based on the stored data can be at least part of the stored data that is generated by the testing robots and/or additional data that is generated based on the stored data. The data generated by a testing robot may include, for example, sensor data from one or more sensors of the robot (e.g., video/images from vision sensors, force measures from force sensors, position measures from position sensors, measures from tactile sensors) and/or data that indicates error condition(s) encountered during operation of the robot (e.g., due to erroneous robot instructions, due to robot instructions causing operational and/or safety limits to be exceeded, due to collisions between robots and environmental features and/or self collisions, etc.).

In implementations where additional data generated based on the stored data is provided in response to a request (in addition to or instead of the stored data), various types of additional data may be provided. For example, the additional data may include an analysis of the robot instructions based on the stored data (e.g., a success rate of a robot task implemented via the robot instructions), a modification of the robot instructions determined based on the stored data, and/or training examples generated based on the stored data. As another example, in some implementations a neural network model may be provided in a request along with the robot instructions, training examples generated based on the stored data, the neural network model trained based on the training examples, and the additional data may include the neural network model as updated based on the training.

In various implementations, one or more of the plurality of testing robots include one or more hardware components that are different from, configured differently from, and/or that have different wear characteristics than hardware components of other testing robots. In various implementations, one or more of the plurality of testing robots additionally and/or alternatively include one or more software components (e.g., drivers, operating system) that are different from and/or configured differently from those of other testing robots. Further, in various implementations different testing robots may interact with different environmental objects and/or different configurations of those environmental objects; may include different non-interacted with objects in their operating space; and/or may include different environmental conditions in their operating space. Moreover, in various implementations the environmental objects interacted with by a given testing robot, other objects in the operating space of the given testing robot, and/or environmental conditions in the operating space may be varied during the course of operation of the given testing robot based on the robot instructions of a given request. In one or more of the preceding implementations, variability among hardware components, software components, and/or environmental parameters of multiple testing robots may provide diversity in the data generated by the testing robots based on robot instructions received in a request and/or diversity and/or robustness in the additional data generated based on that data.

In some implementations, a method is provided that includes: receiving robot instructions to be performed by a robot; at each of a plurality of control cycles of one or more processors of the robot: receiving trajectories to be implemented by actuators of the robot, wherein the trajectories define motion states for the actuators of the robot during the control cycle or a next control cycle, and wherein the trajectories are generated based on the robot instructions; determining, based on a current motion state of the actuators and the trajectories to be implemented, whether implementation of the trajectories by the actuators prevents any collision avoidance trajectory from being achieved; when implementation of the trajectories by the actuators does not prevent any collision avoidance trajectory from being achieved, providing the trajectories for operating the actuators of the robot during the control cycle or the next control cycle; and when implementation of the trajectories prevents any collision avoidance trajectory from being achieved, providing collision avoidance trajectories for operating the actuators of the robot during the control cycle or the next control cycle, without implementing the trajectories.

This method and other implementations of technology disclosed herein may each optionally include one or more of the following features.

In some implementations, the collision avoidance trajectories may have been determined in a prior control cycle. In some implementations, determining whether implementation of the trajectories prevents any collision avoidance trajectories from being achieved may be based on projecting one or more future motion states of the actuators based on the current motion state. In some implementations, receiving the trajectories may include receiving, during the control cycle, trajectories to be implemented by the actuators during the next control cycle.

In some implementations, the trajectories may be generated pseudo-randomly. In some implementations, the trajectories may be generated based on output of a neural network model. In some implementations, the collision avoidance trajectories may include safe stopping trajectories achievable by the actuators of the robot. In some implementations, the method may further include receiving, by one or more of the processors, environmental parameters that indicate one or more properties of environmental objects that are external to the robot. Determining whether implementation of the trajectories by the actuators prevents any collision avoidance trajectories from being achieved may be based on the environmental parameters.

In some implementations, the robot may be a one of a plurality of robots. In some such implementations, the method may further include: operating each of the plurality of robots based on the robot instructions; storing, by one or more of the processors in one or more computer readable media, data generated by the plurality of robots during the operation of the plurality of robots based on the robot instructions; and providing, by one or more of the processors, at least some of the data or additional data generated based on the data.

In some implementations, the data generated by the plurality of robots may include data indicative of one or more determinations that collision avoidance trajectories were provided for operating actuators of one or more of the plurality of robots. In some implementations, the additional data generated based on the data may include updated robot instructions.

In some implementations, the method may further include: configuring a simulated operating space of a robot simulator based on received environmental parameters; operating the robot simulator based on the robot instructions with the simulated operating space configured based on the received environmental parameters; and storing, by one or more of the processors in one or more of the computer readable media, simulated data generated by the robot simulator during the operation of the robot simulator based on the robot instructions. In some implementations, providing at least some of the data may include providing at least some of the simulated data or the additional data further based on the simulated data.

In another aspect, a method may include: receiving, by one or more processors, robot instructions to be performed by a robot; determining, by one or more of the processors, for each iteration of a sequence of motion states traversed by one or more actuators of the robot based on the robot instructions, collision avoidance trajectories achievable by actuators of the robot from a future motion state; while the one or more actuators of the robot are in a given motion state of the sequence of motion states, determining, by one or more of the processors, that collision avoidance trajectories are not achievable by the actuators in a future iteration of the sequence of motion states; and operating, by one or more of the processors, the robot to implement a collision avoidance trajectory associated with the given motion state in response to determining that the collision avoidance trajectories are not achievable in the future iteration.

Other implementations may include a non-transitory computer readable storage medium storing instructions executable by one or more processors (e.g., central processing unit(s) (CPU(s)) or graphics processing unit(s) (GPU(s))) to perform a method such as one or more of the methods described above. Yet another implementation may include a system of one or more computers and/or one or more robots that include one or more processors operable to execute stored instructions to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
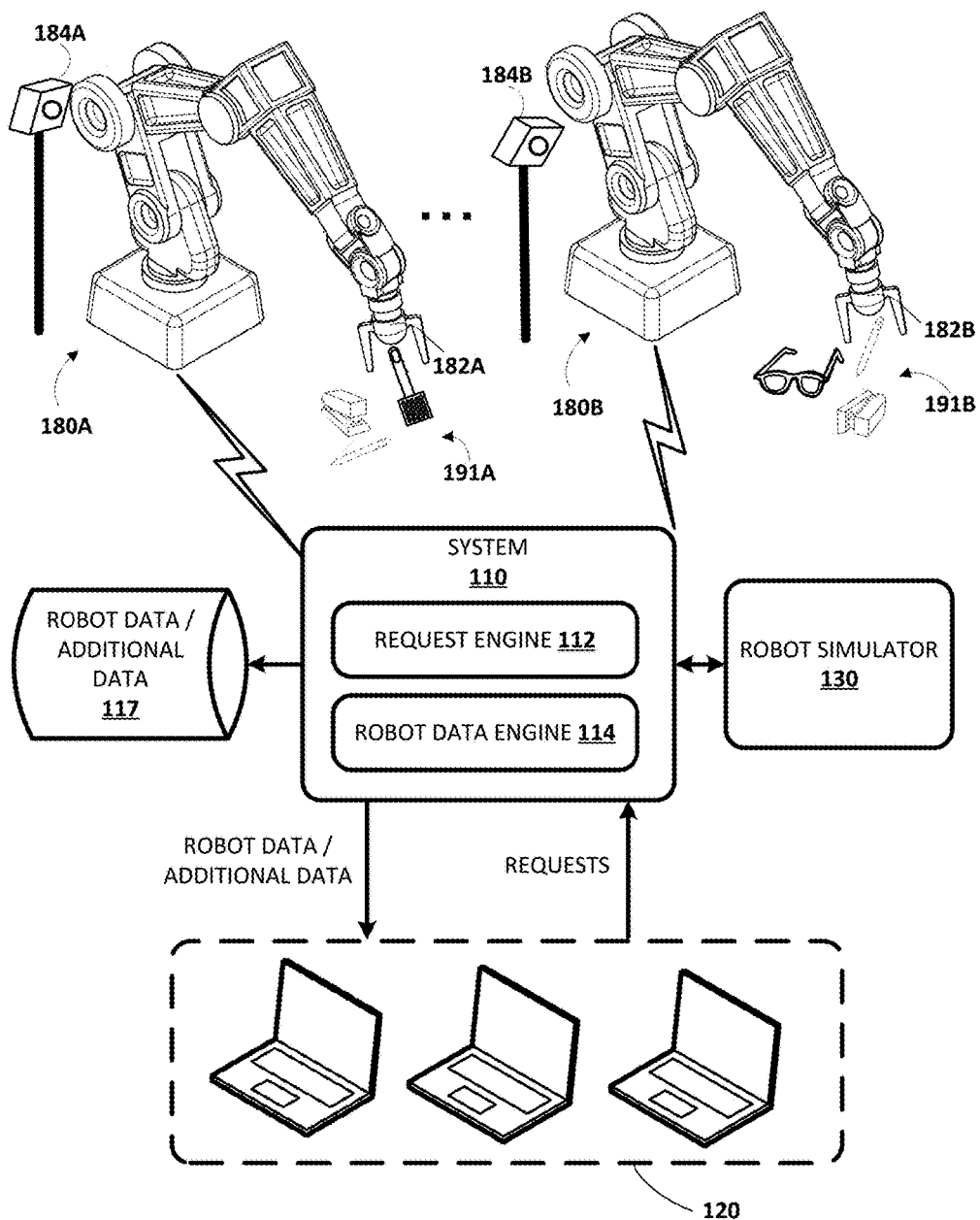
FIG. 1 illustrates an example environment in which implementations disclosed herein may be implemented.

The present disclosure is directed to methods, systems, and apparatus for robot collision detection and avoidance. In some implementations, for each iteration of a plurality of control cycles of a robot, it may be determined, in conjunction with implementing robot instructions that are potentially untested and/or unpredictable, whether any collision avoidance trajectories associated with the robot's actuators are prevented from being achieved in a future iteration of the plurality of control cycles. In response to this determination, one or more actuators of the robot may be operated to selectively implement either trajectories generated based on the robot instructions or collision avoidance trajectories. In some implementations, data regarding implementation of any collision avoidance trajectories may be generated and/or stored, e.g., so that additional data (e.g., robot instructions altered to decrease collision risk, updated neural network model, etc.) may be generated therefrom.

Some implementations of the technology described herein are further directed to receiving a request that includes robot instructions and/or environmental parameters, operating each of a plurality of testing robots based on the robot instructions and/or in an environment configured based on the environmental parameters, and storing data generated by the testing robots during the operating. In some implementations, information based on the stored data is provided in response to the request. The information based on the stored data may include at least part of the stored data that is generated by the testing robots and/or additional data that is generated based on the stored data.

In implementations where the stored data is provided in response to the request, it may be utilized for various purposes such as analysis of performance of the robot instructions (e.g., to determine error conditions, success rate of a task implemented by the robot instructions, performance issues, and/or collision issues), modification of the robot instructions, and/or to generate training examples for training of a neural network model. The generated data may include, for example, sensor data from one or more sensors of the robot (e.g., video/images from vision sensors, force measures from force sensors, position measures from position sensors, measures from tactile sensors), and/or data that indicates error condition(s) encountered during operation of the robot (e.g., due to erroneous robot instructions, due to robot instructions causing operational and/or safety limits to be exceeded, due to collisions, etc.).

In implementations where additional data generated based on the stored data is provided in response to the request (in addition to or instead of the stored data), various types of additional data may be provided. For example, the additional data may include an analysis of the robot instructions based on the stored data, a modification of the robot instructions determined based on the stored data, and/or training examples generated based on the stored data. For instance, the additional data may include a success rate of a task implemented by the robot instructions such as a rate of successful grasp for a grasping task. A rate of successful grasp may be determined, for example, based on sensor data from force sensor(s) of a grasping end effector following a grasp attempt and/or analysis of images captured following a grasp attempt. Also, for example, the robot instructions may be provided with a neural network model, training examples generated based on the stored data, the neural network model trained based on the training examples, and the additional data may include the neural network model as updated based on the training. For instance, the robot instructions may include instructions for utilizing the trained neural network model in the operation of the testing robots (e.g., instructions that define the input parameters of the model and how the output of the model is utilized to control the operation of the testing robots)—and data from operating the testing robots based on the neural network model used to generate training examples to update the neural network model. Also, for instance, the robot instructions may include instructions for operating the robot, without utilization of the model, to generate training examples for the model, and data from operating the robot based on the robot instructions may be used to initially train and/or update the neural network model.

The environmental parameters provided in a request may likewise take various forms. For example, the environmental parameters may specify one or more particular objects to be interacted with by a robot (e.g., a spatula, a cup, a plate, a door with a round knob, a door with a handle) or a class of objects to be interacted with by a robot (e.g., kitchen items, doors). Also, for example, the environmental parameters may specify one or more pose constraints for an initial configuration of the environmental objects (e.g., within a certain area, within a particular container, within a certain range of poses relative to a testing robot). Also, for example, the environmental parameters may specify one or more additional objects in the environment that may not necessarily be directly interacted with by the robot such as surfaces on which interaction objects may rest, background objects, obstacles, etc. Also, for example, environmental parameters may specify one or more environmental conditions such as lighting conditions, temperature conditions, humidity conditions, etc. In some implementations, one or more of the environmental parameters may optionally be configured via a graphical user interface of a first computing device and transmitted to a separate computing device as part of a request.

It will be appreciated that after a given testing robot is operated in accordance with a request, the instructions and/or environmental conditions of the given testing robot may be updated in accordance with another request. The given testing robot may then be operated based on the updated instructions and/or environmental conditions of the other request to generate data for the other request. The methods and apparatus described herein enable the robot instructions of testing robots to be altered over time, and environmental parameters of those testing robots to be altered, to thereby accommodate multiple requests that each contain unique robot instructions and/or unique environmental conditions.

In some implementations, a robot simulator may also be utilized to generate simulated data that may be utilized, for example, to supplement the data generated by the physical robots. For instance, at least some of the simulated data may also be provided in response to a request and/or may be utilized (optionally in combination with the data from the physical robots) to generate additional data that is provided in response to a request. As one example, a simulated operating space of the robot simulator may be configured based on the environmental parameters and the robot simulator operated based on the robot instructions. Simulated sensor data generated by the robot simulator during the operation of the robot simulator based on the robot instructions may be stored—and utilized as described above. Moreover, the robot simulator may optionally implement one or more of the robot collision detection and avoidance techniques described herein (e.g., to prevent implementation of trajectories during the simulation that would cause collision of the simulated robot with itself and/or with virtual objects).

Turning now to the Figures, FIG. 1 illustrates an example environment in which implementations disclosed herein may be implemented. Example robots 180A and 180B are illustrated in FIG. 1. Robots 180A and 180B are "robot arms" having multiple degrees of freedom to enable traversal of grasping end effectors 182A and 182B along any of a plurality of potential paths to position the grasping end effectors 182A and 182B in desired locations. Robots 180A and 180B each further controls the two opposed "claws" of their corresponding grasping end effector 182A, 182B to actuate the claws between at least an open position and a closed position (and/or optionally a plurality of "partially closed" positions). Although robots 180A and 180B are depicted as stationary robots, this is not meant to be limiting. In various implementations, mobile robots such as telepresence robots and other robots capable of autonomous or controlled self-propulsion may employ techniques described herein.

Example vision sensors 184A and 184B are also illustrated in FIG. 1. In FIG. 1, vision sensor 184A is mounted at a fixed pose relative to the base or other stationary reference point of robot 180A. Vision sensor 184B is also mounted at a fixed pose relative to the base or other stationary reference point of robot 180B. As illustrated in FIG. 1, the pose of the vision sensor 184A relative to the robot 180A is different than the pose of the vision sensor 184B relative to the robot 180B. In some implementations, this difference in poses of the vision sensors 184A and 184B may be beneficial to enable robot instructions to be tested on varied configurations and/or to enable diverse sensor data (e.g., sensor data from the vision sensors) to be generated and stored (e.g., for use in generating diverse training examples and/or for other purposes). Vision sensors 184A and 184B are sensors that can generate images related to shape, color, depth, and/or other features of object(s) that are in the line of sight of the sensors. The vision sensors 184A and 184B may be, for example, monographic cameras, stereographic cameras, and/or 3D laser scanners. A 3D laser scanner includes one or more lasers that emit light and one or more sensors that collect data related to reflections of the emitted light.

The vision sensor 184A has a field of view of at least a portion of the operating space of the robot 180A, such as the portion of the operating space that includes example objects 191A. Although resting surface(s) for objects 191A are not illustrated in FIG. 1, those objects may rest on a table, a tray, and/or other surface(s). Objects 191A include a spatula, a stapler, and a pencil. In other implementations more objects, fewer objects, additional objects, and/or alternative objects may be provided during all or portions of operating robot 180A based on robot instructions received in a request as described herein. The vision sensor 184B has a field of view of at least a portion of the operating space of the robot 180B, such as the portion of the operating space that includes example objects 191B. Although resting surface(s) for objects 191B are not illustrated in FIG. 1, they may rest on a table, a tray, and/or other surface(s). Objects 191B include a pencil, a stapler, and glasses. In other implementations more objects, fewer objects, additional objects, and/or alternative objects may be provided during all or portions of operating robot 180B based on robot instructions received in a request as described herein.

Although particular robots 180A and 180B are illustrated in FIG. 1, additional and/or alternative robots may be utilized, including additional robot arms that are similar to robots 180A and 180B, robots having other robot arm forms, robots having a humanoid form, robots having an animal form, robots that move via one or more wheels (e.g., self-balancing robots), submersible vehicle robots, an unmanned aerial vehicle ("UAV"), and so forth. Also, although particular grasping end effectors are illustrated in FIG. 1, additional and/or alternative end effectors may be utilized, such as alternative impactive grasping end effectors (e.g., those with grasping "plates", those with more or fewer "digits"/"claws"), "ingressive" grasping end effectors, "astrictive" grasping end effectors, or "contigutive" grasping end effectors, or non-grasping end effectors. Additionally, although particular mountings of vision sensors 184A and 184B are illustrated in FIG. 1, additional and/or alternative mountings may be utilized. For example, in some implementations vision sensors may be mounted directly to robots, such as on non-actuable components of the robots or on actuable components of the robots (e.g., on the end effector or on a component close to the end effector).

Robots 180A, 180B, and/or other robots may be operated based on robot instructions received in a request and/or in an operating space configured based on environmental parameters received in a request—and data generated by sensor(s) and/or other components of the robots during the operation may be stored and utilized for various purposes. For example, robot 180A, robot 180B, and additional robots may be operated in parallel for a first time period based on robot instructions received in a first request, data generated during the operation stored, and at least some of the stored data and/or additional data generated based on the stored data provided in response to the first request. Further, robot 180A, robot 180B, and additional robots may be operated in parallel for a second time period based on robot instructions received in a second request, data generated during the operation stored, and at least some of the stored data and/or additional data generated based on the stored data provided in response to the second request.

System 110 performs, and/or facilitates performance of, various techniques disclosed herein. In some implementations, all or aspects of system 110 may be implemented on robot 180A and/or robot 180B (e.g., via one or more processors of robots 180A and 180B). For example, robots 180A and 180B may each include an instance of the system 110. In some implementations, all or aspects of system 110 may be implemented on one or more computing devices that are separate from, but in network communication with, robots 180A and 180B. In some implementations, system 110 may share one or more aspects in common with computing device 910 of FIG. 9.

Figure 2:
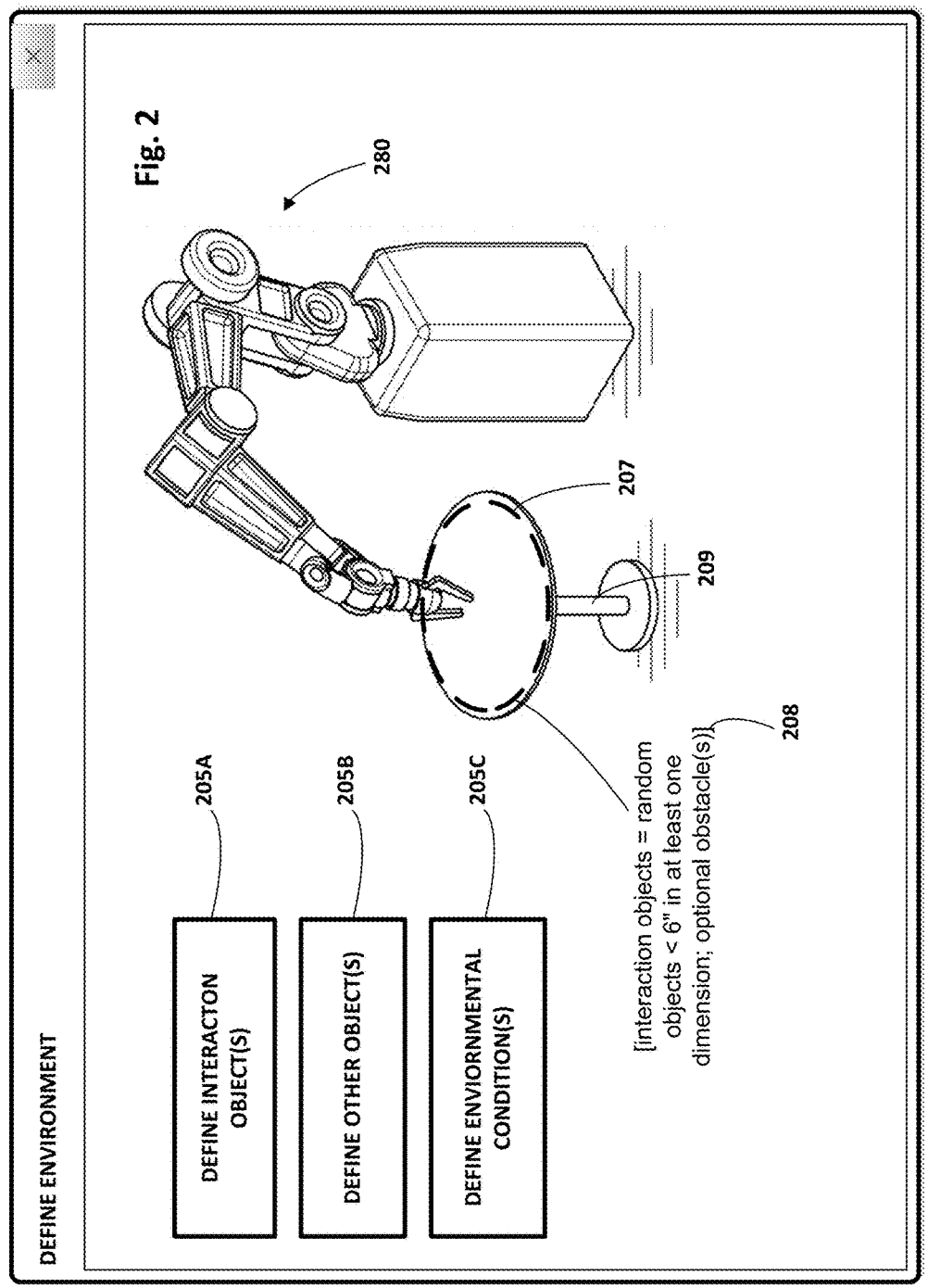
FIG. 2 illustrates an example graphical interface that may be utilized to define environmental parameters for the operation of testing robots according to some implementations disclosed herein.

In the example of FIG. 1, system 110 includes a request engine 112 and a robot data engine 114. The request engine 112 receives and processes requests received from one or more other computing devices, such as one or more client computing devices 120. For example, one of the client computing devices 120 may transmit a request, via one or more network interfaces of the client computing device 120, that is received by the system 110 via one or more network interfaces of the system 110. The request may optionally be transmitted to the system 110 via one or more networks such as a wide area network (e.g., the Internet). In some implementations, a user of one of the client computing devices 120 may formulate all or portions of the request via one of the client computing devices 120 and the request may be transmitted by the client computing device 120 in response to user interface input initiated by the user at the client computing device 120. One example of a graphical user interface that may be utilized to formulate a portion of a request via one of the client computing devices 120 is illustrated in FIG. 2 and described in more detail below.

A request received by request engine 112 may include robot instructions, environmental parameters, a machine learning model (and/or properties of a machine learning model), testing breadth information, testing urgency information, desired data information, and/or other information. In some implementations, multiple (e.g., all) components of a request are included in a single transmission to the system 110. In some other implementations, multiple components of a request are transmitted to the system 110 in separate transmissions. For example, robot instructions of a given request may be provided in a first transmission at a first time and environmental parameters of the given request provided in a separate second transmission at a second time. Although client computing devices 120 are illustrated as laptops in FIG. 1, it is understood that additional and/or alternative computing devices may be provided, such as tablets, smart phones, desktop computers, etc.

When a request includes robot instructions, the request engine 112 may cause one or more testing robots (e.g., robots 180A, 180B, and/or additional robots) to be operated based on the robot instructions. In some implementations, the request engine 112 may load the robot instructions (or a compilation of the robot instructions) in memory or other computer readable media of each of multiple testing robots to cause those testing robots to be operated based on the robot instructions. In some implementations, the robot instructions provided in a request will operate on a robot along with other robot instructions of the robot, such as other robot instructions that control functionality of the robot that is in addition to the functionality controlled by the robot instructions of the request. For example, the robot instructions may be instructions that determine, based on sensor data generated by sensors associated with a robot, the trajectory of a grasping end effector of the robot in effectuating grasp attempts. Those robot instructions may rely on sensor data generated by one or more sensors of the robot based on other robot instructions and may rely on other robot instructions that translate the trajectory of the grasping end effector into low level control commands provided to actuators (e.g., servo motors) of the robot to effectuate the trajectory. Another example of robot instructions that may operate in parallel with the robot instructions of the request are other robot instructions that implement the obstacle detection and collision avoidance techniques described herein.

The robot instructions provided in a request may take various forms. For example, the robot instructions may be provided as object code that can be executed directly by one or more processors of each of the testing robots. In some of those implementations, the request engine 112 may load the object code robot instructions directly to each of multiple robots. Also, for example, the instructions may be provided as source code that must first be compiled before being executed by the testing robots. In some of those implementations, the request engine 112 may compile the robot instructions and load the compilation of the robot instructions to each of multiple robots. Also, for example, the instructions may be provided as a state machine or other data structure that may be implemented by the testing robots in real-time. In some of those implementations, the request engine 112 may load the state machine or other data structure to each of multiple robots and those robots may convert those data structures to object code or other form during operation of the robots based on the robot instructions.

When a request includes environmental parameters, the request engine 112 may provide commands to the testing robots, other robots, other systems, and/or humans to cause a respective operating space of each of one or more testing robots to be utilized in response to the request to be configured based on the environmental parameters. For example, commands may be provided to other robots to cause those robots to configure the operating space of a testing robot based on environmental parameters in advance of testing performed by the robot based on the request. Also, for example, the request engine 112 may generate user interface output to display to one or more humans in advance of testing based on the request. The user interface output may provide information regarding the environmental parameters and optionally dictates the testing robots that are going to be used for the request and whose operating space is to be configured based on the environmental parameters.

The environmental parameters provided in a request may take various forms. For example, the environmental parameters may specify one or more particular objects to be interacted with by a robot (e.g., a spatula, a cup, a plate, a door with a round knob, a door with a handle) and/or a class of objects to be interacted with by a robot (e.g., kitchen items, doors). Also, for example, the environmental parameters may specify one or more pose constraints for an initial configuration of the environmental objects (e.g., within a certain area, within a particular container, within a certain range of poses relative to a testing robot). Also, for example, the environmental parameters may specify one or more additional objects in the environment that may not necessarily be directly interacted with by the robot such as surfaces on which interaction objects may rest, barriers that may constrain the objects to a certain area, background objects, obstacles, etc. Also, for example, environmental parameters may specify one or more environmental conditions such as lighting conditions, temperature conditions, humidity conditions, etc. In some implementations, one or more of the environmental parameters may optionally be configured via a graphical user interface of one of the client computing devices 120. One example of this is described in more detail below with respect to FIG. 2.

In some implementations, a request includes a machine learning model such as a neural network model. In some of those implementations, the machine learning model is to be utilized in operating testing robots based on the request. For example, the robot instructions may include instructions for utilizing a neural network model in the operation of the testing robots. For instance, the robot instructions may define the input parameters of the model and how the output of the model is utilized to control the operation of the testing robots. As one particular example, a neural network model may be utilized in determining a pre-grasp pose based on sensor data from a vision sensor, and the robot instructions may dictate the parameters of the sensor data that is to be applied as input to the model. The robot instructions may further dictate how output generated over the neural network model is to be utilized to determine the pre-grasp pose, how to traverse the end effector to a determined pre-grasp pose, and/or how to attempt a grasp after the pre-grasp pose is reached. In implementations where the machine learning model is to be utilized in operating testing robots based on the request, the request engine 112 causes the multiple testing robots to be operated based on the machine learning model. For example, the request engine 112 may load the neural network model in memory or other computer readable media of each of multiple testing robots, along with the robot instructions, to cause one or more processors of those testing robots to operate the robots based on the robot instructions and the neural network model.

The testing breadth information that may be included in a request indicates a quantity of testing robots to utilize in response to the request and/or a duration of testing that occurs in response to a request. When a request includes testing breadth information, the request engine 112 uses the testing breadth information to determine a quantity of testing robots to utilize in response to the request and/or a duration of testing that occurs in response to the request. The testing urgency information that may be included in a request indicates a time by which data generated based on the testing is expected to be received. The request engine 112 may use the testing urgency information to schedule the testing robots to be operated based on a request. For example, more urgent requests may be scheduled before less urgent requests.

The desired data information that may be included in a request indicates the data that is desired in response to a request. For example, the desired data may indicate which data (if any) generated by testing robots during operation based on the request should be provided in response to the request and/or which additional data (if any) should be generated based on data generated by the testing robots, and provided in response to the request. The request engine 112 may provide the desired data information to the robot data engine 114 to enable the robot data engine 114 to determine and provide desired data in response to a request.

Data is generated by testing robots during operation of the testing robots based on a request. The generated data may include, for example, sensor data from one or more sensors of the robot. For example, the sensor data may include video/images from vision sensors, force measures from force sensors, position measures from position sensors, measures from tactile sensors, and so forth. The generated data may additionally or alternatively include data that indicates error condition(s) encountered during operation of the robot. For example, the data that indicates error conditions may include data generated in response to erroneous robot instructions (e.g., instructions that cause one or more processors of a robot to generate an error when the processor(s) attempt execution of those instructions), data generated in response to robot instructions that cause operational and/or safety limits to be exceeded, data generated in response to robot instructions that cause one or more collision avoidance trajectories to be implemented by one or more robot actuators, etc. At least some of (e.g., all of) the generated data may be stored in association with the request in database 117. The database 117 includes one or more non-transitory computer readable media that are local to one or more of the testing robots and/or remote from one or more of the testing robots. In some implementations, the database 117 may be remote from the testing robots and each of the testing robots may store generated data locally and transmit the data (continuously, periodically, or at other regular or non-regular intervals) to the database 117.

In some implementations, the robot data engine 114 provides, in response to a request, at least some of the data generated by the testing robots during operation based on the request. For example, the robot data engine 114 may transmit the data to the client computing device 120 that submitted the request, to one or more additional client computing devices 120, and/or to another component (e.g., to a separate database). In some implementations, which data is provided in response to a request may be based on the robot data information included in the request. For example, the robot data information of a given request may indicate that video captured by vision sensors associated with testing robots be provided and that any generated error conditions be provided. In implementations where the stored data is provided in response to the request, it may be utilized for various purposes such as analysis of performance of the robot instructions, modification of the robot instructions, and/or to generate training examples for training of a neural network model or other machine learning model.

In some implementations, the robot data engine 114 provides, in response to a request, at least some additional data that is generated based on the data generated by the testing robots during operation based on the request. The additional data may be provided in addition to, or instead of, the data generated by the robots during the operation based on the request. In implementations where additional data generated based on the stored data is provided in response to the request, various types of additional data may be provided. For example, the robot data engine 114 may perform an analysis of the robot instructions based on the stored data and provide the results of the analysis as the additional data. For instance, the success rate of a door opening task implemented by robot instructions may be determined based on force sensor readings preceding and/or following door opening attempts, readings from sensors on doors that are being interacted with, and/or analysis of images before and/or after door opening attempts. Also, for example, the robot data engine 114 may modify the robot instructions based on the stored data and provide the modified robot instructions as the additional data. Also, for example, the robot data engine 114 may generate training examples based on the stored data and in view of a neural network model and/or neural network model properties provide with a request, and provide the training examples as the additional data. As yet another example, the robot data engine 114 may determine, as the additional data, a collision rate and/or a rate at which the robots implemented collision avoidance trajectories (including safe stopping trajectories and otherwise). The robot instructions may then be modified to reduce the collision rate and/or rate at which the robots implement collision avoidance trajectories.

As yet another example, the robot instructions may be provided with a neural network model, the robot data engine 114 may generate training examples based on the stored data and the neural network model, the robot data engine 114 (or a separate engine) may train the neural network model based on the training examples, and the additional data may include the neural network model as updated based on the training. For instance, the robot instructions may include instructions for utilizing the trained neural network model in the operation of the testing robots (e.g., instructions that define the input parameters of the model and how the output of the model is utilized to control the operation of the testing robots)—and data from operating the testing robots based on the neural network model used to generate training examples to update the neural network model. Also, for instance, the robot instructions may include instructions for operating the robot to generate training examples for the model, without utilization of the model, and data from operating the robot based on the robot instructions may be used to initially train and/or update the neural network model.

Robot simulator 130 is also illustrated in the environment of FIG. 1. Robot simulator 130 may be implemented on one or more computing devices that are optionally in addition to any computing device on which the system 110 operates. In some implementations, the request engine 112 may cause the robot simulator 130 to operate based on a request and the robot simulator 130 may generate simulated data during the operation base on the request. For example, the request engine 112 may cause the robot simulator 130 to operate based on the robot instructions and/or environmental parameters of a request. For instance, a simulated operating space of the robot simulator 130 may be configured based on the environmental parameters and the robot simulator 130 may execute the robot instructions or a compilation of the robot instructions.

The simulated data generated by the robot simulator 130 may be utilized to supplement the data generated by the physical testing robots. For example, at least some of the simulated data may also be provided in response to a request and/or may be utilized (optionally in combination with the data from the physical robots) to generate additional data that is provided in response to a request. In some implementations, the simulated data may be utilized to generate training examples for training a neural network model provided with a request. The training based on the simulated data may be an initial training of the model or a subsequent training of the model. In some of those implementations, the neural network model may first be trained based on training examples generated based on the simulated data—and only after such training may the neural network model then be used to operate physical testing robots.

FIG. 2 illustrates an example graphical interface that may be utilized to define environmental parameters for the operation of testing robots according to some implementations disclosed herein. The graphical interface may be graphically represented on a display of one of the client computing devices 120 and a user may interact with the graphical interface via one or more user interface input devices of the computing device.

The graphical interface includes a robot depiction 280, a table depiction 209, a pose constraint depiction 207, interface elements 205A-C, and text 208. The table depiction 209 represents a table that may be present in the operating space of a physical robot, but with which the robot may not directly interact. For example, the robot may not contact the table, or may only incidentally contact the table during manipulation of objects that rest on the table. The pose constraint indicated by pose constraint depiction 207 is a planar bounding area on the surface of the table 209 and defines an area of the surface of the table 209 on which interaction objects can be placed. Interaction objects are environmental objects with which the robot may directly interact (e.g., move, change the configuration of, or otherwise manipulate). The text 208 indicates properties of environmental objects that can be placed on the planar bounding area bounded by the pose constraint depiction 207. In particular, the text 208 indicates that the interaction objects that can be included in the area are "random objects" that are less than six inches in at least one dimension (e.g., to be graspable by a particular grasping end effector). The text 208 further indicates that obstacles that will not be interacted with by the robot may optionally be included in the pose area.

In some implementations, the pose constraint indicated by pose constraint depiction 207 and/or the environmental objects indicated by text 208 may be defined via interaction with interface element 205A. For example, selecting the interface element 205A may provide a drawing tool that enables the user to define the pose constraint indicated by depiction 207 of FIG. 2 and to define the environmental objects with which the robot will interact that are indicated by text 208. In some implementations, the table 209 may be defined by interaction with interface element 205B and environmental conditions (e.g., lighting conditions, temperature conditions) may be defined via interaction with interface element 205C.

Although a particular example is illustrated in FIG. 2, many variations are possible. For example, non-planar pose constraints may be defined, such as a spherical pose constraint. Also, for example, multiple pose constraints and associated object(s) may be defined such as a first pose constraint on a first half of the surface of table 209 that is associated with first object(s) and a second pose constraint on a second half of the table that is associated with second object(s) that differ from the first object(s). As yet another example, certain environmental objects may be "fixed" and not changeable by the user, such as a certain surface on which objects can be placed. Also, for example, three-dimensional models of particular interaction objects and/or other environmental objects may be inserted in the graphical display and pose constraints for those objects optionally defined. For instance, a particular interaction object may be defined with a three-dimensional model and the pose of that three-dimensional model in the graphical interface defined as a pose constraint for that particular interaction object. As yet another example, all environmental constraints may be defined via a graphical interface of a computer aided design (CAD) application. Also, for example, other classes of objects may be defined besides "random objects", such as "household objects", "kitchen objects", "silverware", etc. Also, for example, multiple distinct sets of environmental parameters may be defined for a request such as a first group to be configured for a first group of one or more testing robots and a second group to be configured for a second group of one or more testing robots.

The computing device that renders the graphical interface of FIG. 2 may be in communication with the system 110 and may, in response to certain user interface input, provide environmental conditions defined via the graphical user interface to the request engine 112 of system 110 as part of a request. Further, that same computing device or an additional computing device may be utilized to provide robot instructions, a machine learning model, properties of a machine learning model, testing breadth information, testing urgency information, and/or other information of a request to the system 110. In some implementations, a graphical interface may be provided for defining one or more of those parameters of a request, for uploading robot instructions, etc.

Figure 3:
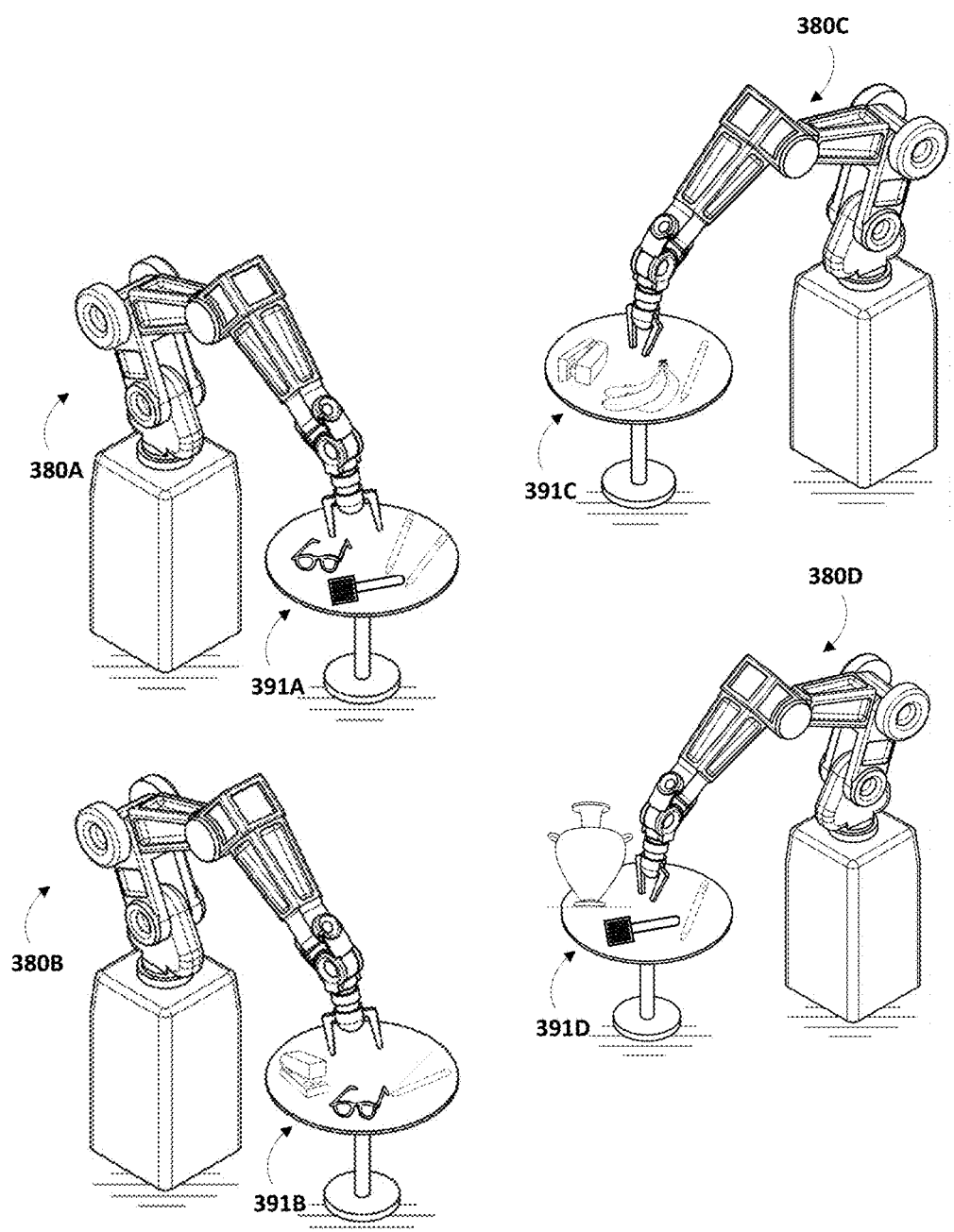
FIG. 3 illustrates multiple testing robots with their operating spaces configured based on defined environmental parameters according to some implementations disclosed herein.

FIG. 3 illustrates multiple testing robots with their operating spaces configured based on the environmental parameters defined via the graphical interface of FIG. 2. The operating spaces may be configured by the robots 380A-D themselves (e.g., by picking up and placing the objects), by other robots, and/or by humans.

Four testing robots 380A-D are illustrated in FIG. 3. More or fewer testing robots may be provided in other implementations. In FIG. 3, the operating space of each of the testing robots 380A-D is configured differently, but is configured in conformance with the environmental parameters defined via the graphical interface of FIG. 2. In particular, objects 391A include interaction objects that all satisfy the pose constraint of FIG. 2, that all conform to the "random object" class, and that all have at least one dimension that is less than six inches. Likewise, objects 391B and 391C include interaction objects that all satisfy the pose constraint of FIG. 2, that all conform to the "random object" class, and that all have at least one dimension that is less than six inches. Objects 391D include interaction objects (the spatula and the pencil) that satisfy the pose constraint, conform to the class, and satisfy the dimension requirement—and also include an object (the vase) that does not conform to the dimension requirement of interaction objects, but instead is an "optional obstacle" that is also in conformance with the environmental parameters defined via the graphical interface of FIG. 2.

It will be appreciated from viewing FIG. 2 that the four groups of objects 391A-D are each placed so that they conform to the environmental parameters, but that the objects and their placements vary in each group. As described herein, this variation in environmental objects may provide diversity in the data generated by the testing robots based on a request and/or diversity and/or robustness in the additional data generated based on that data. Further, in various implementations the environmental objects interacted with by a given testing robot, other objects in the operating space of the given testing robot, and/or environmental conditions in the operating space may be varied during the course of operation of the given testing robot based on the robot instructions of a given request. For example, a human, the given testing robot, and/or another robot may change out one or more (e.g., all) of the environmental objects with other environmental objects that also conform to the environmental parameters.

Figure 4:
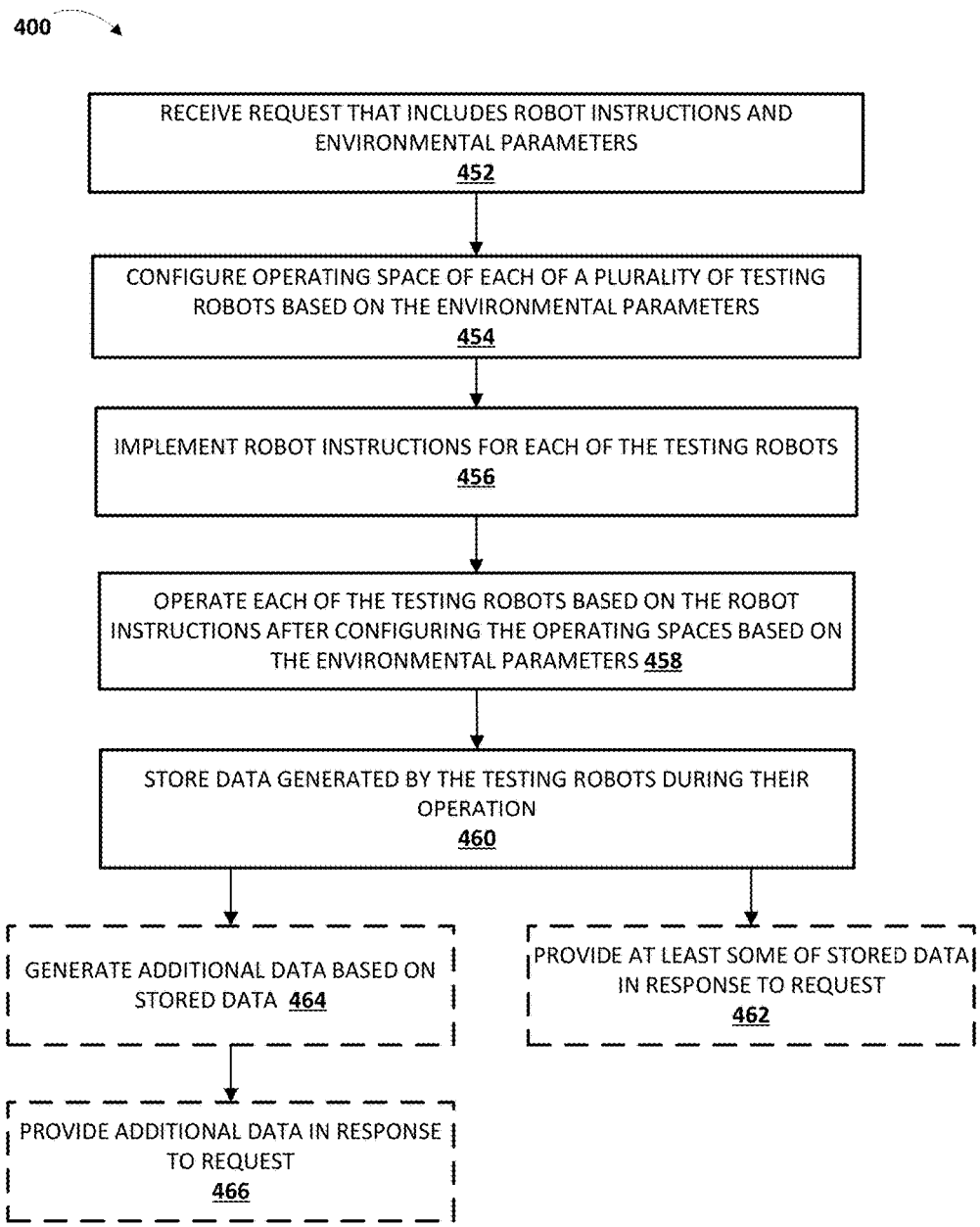
FIG. 4 is a flowchart illustrating an example method of receiving a request that includes robot instructions and environmental parameters; operating each of a plurality of testing robots based on the robot instructions and in an environment configured based on the environmental parameters; storing data generated by the testing robots during the operating; and providing, in response to the request, at least some of the stored data and/or additional data that is generated based on the stored data.

FIG. 4 is a flowchart illustrating an example method 400 of receiving a request that includes robot instructions and environmental parameters; operating each of a plurality of testing robots based on the robot instructions and in an environment configured based on the environmental parameters; storing data generated by the testing robots during the operating; and providing, in response to the request, at least some of the stored data and/or additional data that is generated based on the stored data. For convenience, the operations of the flowchart are described with reference to a system that performs the operations. This system may include one or more components of the system 110 and/or one or more components of a robot, such as a processor and/or robot control system of robot 180A, 180B, 740, and/or other robot. Moreover, while operations of method 400 are shown in a particular order, this is not meant to be limiting. One or more operations may be reordered, omitted or added.

At block 452, the system receives a request that includes robot instructions and environmental parameters. In some implementations, the request may include additional information such as a neural network model, properties of a neural network model, testing breadth information, testing urgency information, and/or desired data information. In some implementations, additional environmental parameters may be received, e.g., from a user (e.g., simulated or imaginary environmental parameters, safe boundaries of operation, etc.) or in response to one or more sensor signals indicative of an actual new object detected in the environment, after the operations of block 452.

At block 454, an operating space of each of a plurality of testing robots is configured based on the environmental parameters. For example, the system may instruct one or more robots to place interaction objects having properties defined by the environmental parameters in the operating space of each of the testing robots. Also, for example, the system may interface with a lighting control system to adjust the lighting in the operating spaces of each of the testing robots based on environmental conditions defined by the environmental parameters and/or may interface with a climate control system to adjust temperature and/or humidity in the operating spaces based on defined environmental conditions. As yet another example, the system may generate user interface output to display to one or more humans in advance of testing based on the request, where the output provides information regarding the environmental parameters and optionally dictates the testing robots that are going to be used for the request. The human(s) may then configure the operating spaces based on the user interface output. In some implementations the testing robots of block 454 may all be located in the same room or in the same building.

In some implementations, each of one or more (e.g., all) operating spaces of the testing robots may be configured differently, but still in conformance with the environmental parameters. In some implementations, a quantity of testing robots that are configured at block 454 may optionally be determined by the system based on testing breadth and/or testing urgency information optionally included in the request of block 452. Also, in some implementations, a time at which one or more of the operating spaces is configured at block 454 may optionally be determined by the system based on testing urgency information optionally included in the request of block 452.

At block 456, the system implements the robot instructions of the request for each of the testing robots. For example, the system may load the robot instructions, or a compilation of the robot instructions, in one or more computer readable media associated with the testing robots for execution by one or more processors of the testing robots. In many implementations, in combination with (e.g., before) loading the robot instructions on a given robot, the system may remove or otherwise disable previously loaded robot instructions from an immediately prior request acted on by the robot.

At block 458, the system operates each of the testing robots based on the robot instructions after configuring the operating spaces based on the environmental parameters. For example, the system may provide one or more commands to the testing robots to cause them to initiate operation based on the robot instructions. In some implementations, one or more of the testing robots may optionally operate based on the robot instructions in parallel for one or more time periods.

At block 460, the system stores data generated by the testing robots during their operation. The generated data may include, for example, sensor data from one or more sensors of the robot and/or data that indicates error condition(s) encountered during operation of the robot.

At block 462, the system optionally provides at least some of the stored data in response to the request of block 452. For example, the system may provide all of the stored data or a subset of the stored data. In some implementations, which stored data is provided may be based on desired data information that is optionally included in the request of block 452.

At block 464, the system optionally generates additional data based on the stored data. The system may generate various types of additional data. For example, the additional data may include training examples generated based on the stored data. For instance, the request of block 452 may include a neural network model, or parameters for the neural network model, and the system may generate training examples based on the model or parameters. For instance, the training examples may be generated with training example input that conforms to input parameters of the neural network model and with training example output that conforms to output parameters of the neural network model.

As another example, in some implementations a neural network model may be provided in a request along with the robot instructions, training examples generated based on the stored data, the neural network model trained based on the training examples, and the additional data may include the neural network model as updated based on the training. In some of those implementations, the neural network model may be utilized in the operation of the testing robots that generated the stored data. In some other of those implementations, the neural network model may not be utilized in the operation of the testing robots that generated the stored data. For example, the robot instructions may be instructions configured to generate desired data for generating training examples to train the model, but the model itself may not be utilized in combination with the instructions.

At block 466, the system optionally provides the additional data in response to the request of block 452. In some implementations, the system performs either blocks 462 or blocks 464 and 466. In some other implementations, the system performs all of blocks 462, 464, and 466. Additional iterations of the method 400 may be performed in response to additional requests.

Figure 5:
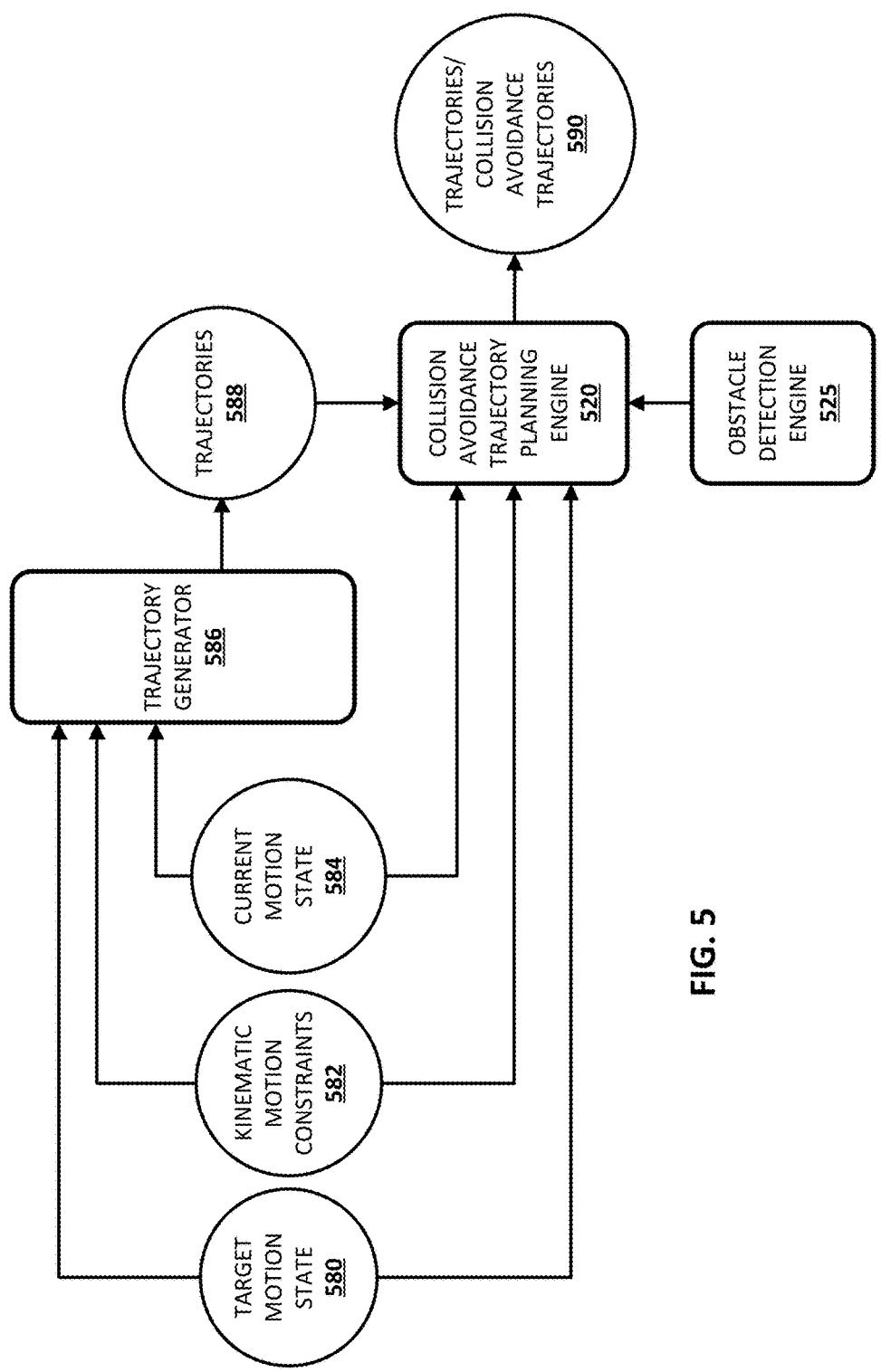
FIG. 5 illustrates an example environment in which collision avoidance techniques disclosed herein may be implemented.

FIG. 5 illustrates an example environment in which collision avoidance techniques disclosed herein may be implemented. The environment includes a trajectory generator 586, a collision avoidance trajectory planning engine 520, and an obstacle detection engine 525. The trajectory generator 586, engine 520, and/or engine 525 may be implemented by one or more processors, such as one or more processors that are local to a robot and/or that are in communication with (but separate from) the robot. In some implementations, the trajectory generator 586 may be implemented using known trajectory planning techniques, whereas the engines 520 and 525 may be responsible for performing collision avoidance techniques described herein.

The trajectory generator 586 generates trajectories 588 in real-time based on a current motion state 584 of actuators of the robot, a target motion state 580 of the actuators, and kinematic motion constraints 582. In some implementations, generating trajectories in real-time means generating trajectories within a control cycle of a robot for which the trajectories are generated.

The target motion state 580 defines a desired motion state to be reached by the actuators of a robot, such as robot 100. For example, the target motion state may define particular positions of the actuators and zero velocity, zero acceleration, etc. For instance, the target motion state may be a motion state where the positions of the actuators cause an end effector to be at a particular position and maintain that position. As another example, the target motion state may define particular positions of the actuators and non-zero velocities, accelerations, and/or jerks for one or more of the actuators. For instance, the target motion state may be a motion state that causes an end effector to be at a particular position and arrive at that position with a particular velocity.

Various techniques may be utilized to determine the target motion state. For example, the target motion state may be provided by a path planner of the robot. Also, for example, the path planner may provide a target motion state of an end effector, and the target motion state for the actuators may be determined based on the target motion state of the end effector. For instance, the path planner may provide a target motion state of the end effector that is a waypoint in Cartesian space and the target motion states of the actuators in joint space determined based on applying that waypoint to a kinematic model of the robot (to determine positions of actuators that will cause a reference point of the end effector to be at that waypoint).

In some implementations, the target motion state 580 for actuators may be determined based on robot instructions (described above) being executed by the robot. For instance, the robot may be programmed with the robot instructions to move a reference point of the robot from a current position to one or more waypoints in response to the robot instructions. In some implementations, the robot instructions may include a plurality of instructions to perform random and/or pseudo-random movements. For example, the robot instructions may be randomly and/or pseudo-randomly generated to cause the robot to perform a sequence of random operations that are intended to test the robot's capabilities, test the robot's collision avoidance abilities, identify heretofore unknown sequences of movements that may result in a collision and/or violation of kinematic constraints, etc. Under such circumstances it is possible that two or more random robot movements implemented by actuators of a robot based on the robot instructions may result in a collision, e.g., between the robot and some aspect of the environment and/or a self collision. Additionally or alternatively, two or more random robot movements implemented by actuators of a robot based on the robot instructions may cause the robot to attempt to perform movements that violate its kinematic constraints. In other words, such robot instructions may pose a risk to a robot and/or its environment that is greater than instances in which the robot is provided with robot instructions associated with a known and well-defined task (e.g., for which path planning and forward-looking collision avoidance is more readily available).

The current motion state 584 defines a current motion state of the actuators of a robot, such as robot 100. For example, when the robot is currently stationary, the current motion state may define particular positions of the actuators and zero velocity, zero acceleration, etc. Also, for example, when the robot is currently in motion, the current motion state may define particular positions of the actuators and non-zero velocities, accelerations, and/or jerks for one or more of the actuators.

The kinematic motion constraints 582 define constraints for each of the actuators. The kinematic motion constraints 582 may include, for example, minimum/maximum velocities, minimum/maximum positions, minimum/maximum accelerations, minimum/maximum jerks, and/or minimum/maximum jounces.

In some implementations, the trajectory generator 586 utilizes the target motion state 580, the kinematic motion constraints 582, and the current motion state 584 to generate a trajectory for each of the actuators. The trajectory generator 586 generates the trajectories to transfer the current motion state 584 of the actuators to the target motion state 580 of the actuators in view of the kinematic motion constraints 582. In some of those implementations, the trajectory generator 586 seeks to transfer the current motion state 584 to the target motion state 580 in a manner that is time-optimal in view of the current kinematic motion constraints 582. In some implementations, to generate a trajectory for a given actuator, the trajectory generator 586 may select, from a finite group of motion profiles, a motion profile that transfers the given actuator from its current motion state to its target motion state within the shortest time possible while conforming to the current kinematic motion constraints 582 for that actuator. In some implementations, the trajectory generator 586 selects a motion profile based on decision trees. Each of the motion profiles of the finite group may include a velocity profile, an acceleration profile, and/or a jerk profile. Accordingly, the trajectory generated based on a selected motion profile may define motion states (e.g., positions, velocities, accelerations, jerks over time) for the given actuator.

The trajectory generator 586 may iteratively generate new trajectories 588 at each control cycle, in response to identifying a new target motion state 580, and/or in response to other signals. For example, at each control cycle the trajectory generator 586 may generate new trajectories 588 taking into account the current motion state 584 at that control cycle, the target motion state 580 at that control cycle, and the kinematic motion constraints 582 at that control cycle.

The collision avoidance trajectory planning engine 520 may determine, for each of the robot actuators, an achievable collision avoidance trajectory for an iteration of the trajectory generator 586. For example, the engine 520 may determine, for each of the actuators, whether a safe stopping trajectory will be achievable when the robot transitions to the target motion state 580. In some implementations, the engine 520 may determine collision avoidance trajectories based on a current configuration of the actuators (e.g., as determined based on the current motion state 584), based on a mapping of obstacles in configuration space and/or other data related to obstacles provided by obstacle detection engine 525, based on one or more kinematic constraints 582 associated with one or more robot actuators, and/or based on a target configuration of the actuators based on the target motion state 580. In other implementations, the engine 520 may determine collision avoidance trajectories based on trajectories 588 provided by trajectory generator 586 (which may already have already been generated based on, and therefore inherently represent, target motion state 580 and/or current motion state 584) and kinematic constraints 582. In other words, the engine 520 may determine collision avoidance trajectories based on trajectories to be implemented (e.g., in the current control cycle or the next control cycle) and kinematic constraints 582 of the robot actuators (e.g., the engine 520 may not directly receive the target motion state 580 and the current motion state 584).

Obstacle detection engine 525 detects obstacles in the environment of a robot and provides information related to those obstacles to engine 520. In some implementations, the obstacle detection engine 525 detects obstacles based on vision sensor data received from one or more vision sensors that are coupled to the robot and/or that otherwise view the environment of the robot. The vision sensor data may be, for example, two-dimensional ("2D") images, "2.5D" images that include a depth channel, and/or a three-dimensional ("3D") point cloud. The vision sensors may be, for example, a monographic camera (e.g., that generates 2D images), a stereographic camera (e.g., that generates 2.5D images with a depth channel), and/or a laser scanner (e.g., that generates a 3D point cloud). For example, the obstacle detection engine 525 may utilize one or more object detection and pose estimation techniques to determine poses of various objects in the environment and provide information related to those poses relative to one or more reference frames. For instance, the obstacle detection engine 525 may determine the pose of various objects, and map one or more of those objects in a configuration space of the robot based on their poses.

In some implementations, obstacle detection engine 525 may determine poses of various "virtual" objects in the environment, e.g., based on a stored map of the environment of the robot, where the map includes indications of the objects and their poses in the environment. For example, obstacle detection engine 525 may consult a user-defined map of the environment that includes imaginary objects defined by a user, such as a user that submitted robot instructions to be tested and/or a user that separately defines operating parameters for testing robots. As noted above, imaginary/simulated objects (or more generally, environmental parameters) may be defined by a user, e.g, using a user interface such as that depicted in FIG. 2. Such environmental parameters may be provided by a user in some instances to define a safe working space for a robot, such as a box, sphere, or other three-dimensional volume that defines artificial boundaries in which the robot can safely operate.

In some implementations, the obstacle detection engine 525 may provide information related to those poses relative to one or more reference frames. For instance, the obstacle detection engine 525 may determine the pose of various objects based on the stored map, and map one or more of those objects in a configuration space of the robot based on their poses. Additional and/or alternative techniques may be utilized by the obstacle detection engine 525 to determine obstacles in an environment of a robot and/or to provide information related to those obstacles for use by the collision avoidance trajectory planning engine 520. In various implementations, such as implementations where vision sensor data is utilized, the obstacle detection engine 525 may update information related to obstacles in real-time and/or other periodic or non-periodic intervals. In those implementations, the engine 520 may have access to updated obstacle information to enable one or more new collision avoidance trajectories to be determined in response to dynamic objects.

In some of the implementations where obstacle detection engine 525 maps obstacles in a configuration space of the robot, prior to a given iteration of the real-time trajectory generator 586, the engine 520 may determine, based on a current motion state 584 of the actuators and the trajectories to be implemented (e.g., target motion state 580), whether implementation of trajectories by the actuators prevents any collision avoidance trajectories from being achieved. When implementation of the trajectories by the actuators does not prevent any collision avoidance trajectories from being achieved, engine 520 may determine and persist, e.g., in robot memory or elsewhere, collision avoidance trajectories 578 that are achievable. Engine 520 may then provide trajectories 588 generated by trajectory generator 586 as trajectories 590 to be implemented by the robot actuators. On the other hand, when engine 520 determines that implementation of the trajectories 588 prevents any collision avoidance trajectory associated with any actuator from being achieved, engine 520 may provide, e.g., as trajectories 590 to be implemented by the robot actuators, collision avoidance trajectories (e.g., persisted from a previous control cycle) for operating the actuators of the robot during the control cycle or the next control cycle, without implementing the trajectories 588 associated with the target motion state 580.

Figure 6:
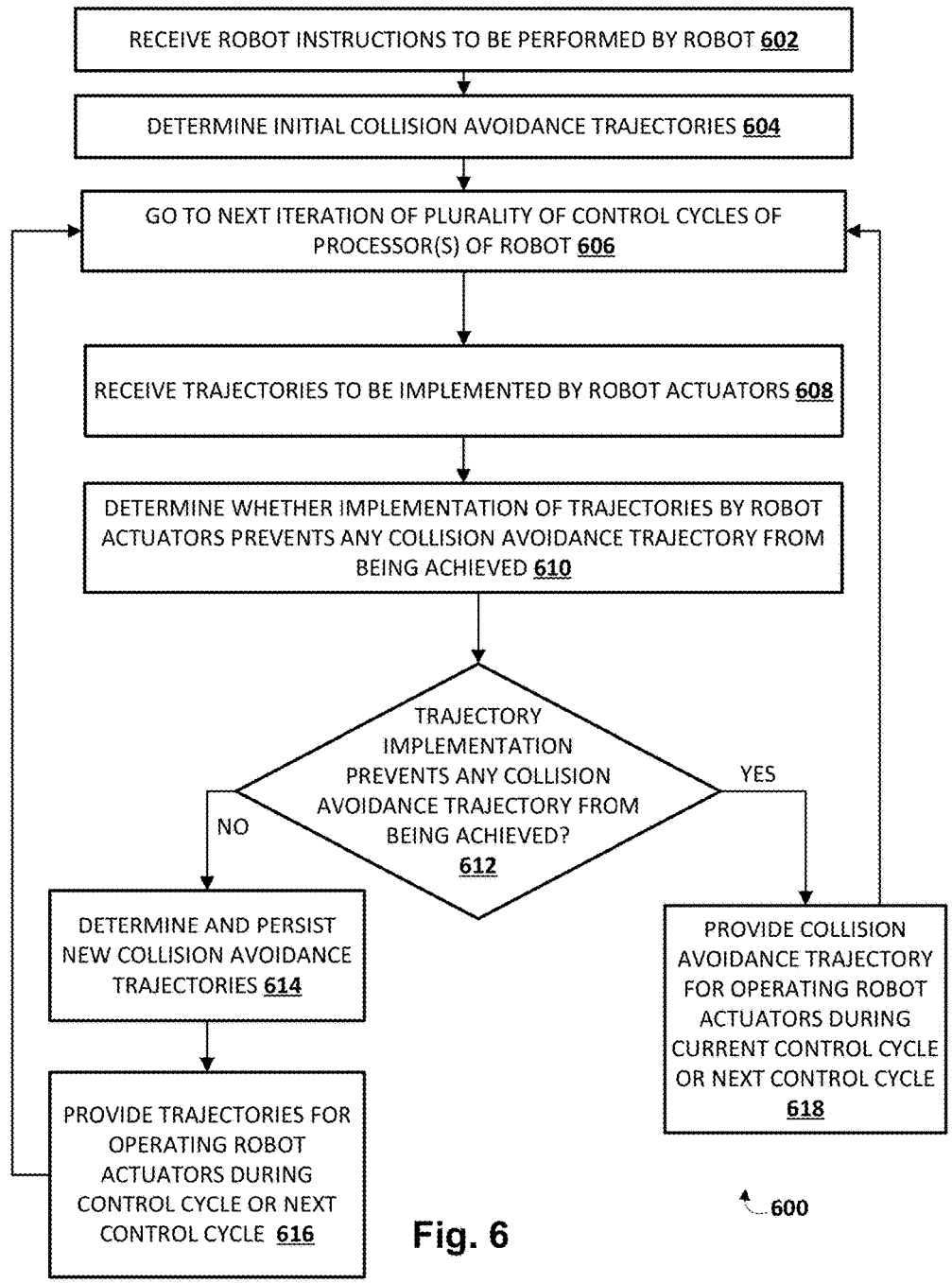
FIG. 6 is a flowchart illustrating an example collision avoidance method, in accordance with various implementations.

FIG. 6 is a flowchart illustrating an example method 600 of operating one or more robots, such as the testing robots described above, in a manner that avoids collisions caused by robot instructions for which collision potential is relatively unknown at the outset. For convenience, the operations of the flowchart are described with reference to a system that performs the operations. This system may include one or more components of the system 110 and/or one or more components of a robot, such as a processor and/or robot control system of robot 180A, 180B, 740, and/or other robot. Moreover, while operations of method 600 are shown in a particular order, this is not meant to be limiting. One or more operations may be reordered, omitted or added.

At block 602, the system receives robot instructions to be performed by one or more robots. As noted above, these robot instructions may include source code that is then compiled, by a robot or prior to uploading to a robot. Additionally or alternatively, these robot instructions may include one or more state machines that contain states and/or state transitions that may be implemented by the one or more robots to perform various tasks.

In various implementations, the remaining operations of method 600 may be implemented to cause the one or more robots to perform real time collision detection, avoidance, and/or reporting. In particular, these operations avoid damage to robots themselves and/or their environment, and provide a way for the requesting party to determine various characteristics of the robots and/or the robot instructions, such as which sequence of movements are likely to result in a collision, how those movements (and hence, the underlying robot instructions) can be modified to better avoid the collisions, how artificial constraints (environmental and/or kinematic) may be imposed to reduce the likelihood of collisions, and so forth.

These collision avoidance operations may be advantageous when, for instance, creating a service in which third party developers can deploy and run software onto a set of unattended robots. The collision avoidance operations may be implemented at a relatively low level, e.g., in real-time (e.g., at the rate of the controller, during each control cycle). This may allow the developer freedom to create robot instructions to cause a wide variety of robot behaviors that may or may not be unpredictable, without fear that collisions will occur. In some implementations, setpoints (e.g., position, velocity, and/or acceleration commands) may be implemented at a relatively high rate (e.g. 100 Hz) and may ensure that no matter what robot instructions are implemented by the robot, specified safety regions (self-collision and collision with the environment) will not be penetrated.

At block 604, the system may determine and persist, e.g., in robot memory or elsewhere, initial collision avoidance trajectories that can be implemented by the robot actuators to avoid a collision from the outset of operating the robot based on the robot instructions. In some implementations, the initial collision avoidance trajectories may simply be actuator commands to remain at rest or to go back to a starting configuration, although this is not meant to be limiting.

At block 606, the system may go to the next iteration of a plurality of control cycles of one or more processors of the robot. In some implementations, one or more robot instructions may be executed at each processing cycle of one or more processors of a robot (e.g., at 500 Hz or at another frequency). In other implementations, a robot instruction may require more than one processing cycle for performance. At block 606, if the robot is just beginning to perform robot instructions, then the "next" iteration of the plurality of control cycles may be the first iteration. And while not depicted in FIG. 6 specifically, if there are no more robot instructions to implement, then method 600 may end.

During each iteration of the plurality of control cycles, the system may perform the operations of blocks 608-618 to avoid and/or reduce collisions potentially caused by the robot instructions received at block 602. At block 608, the system may receive trajectories to be implemented by robot actuators during the control cycle or a next control cycle. For example, the trajectories may be generated, e.g., by a component such as trajectory generator 586, based on one or more of a target motion state 580 (which as noted above may be determined based at least in part on the robot instructions), kinematic motion constraints 582 of the robot, and a current motion state 584 of the robot.

At block 610, the system may determine whether implementation of the trajectories received at block 608 by the robot actuators during the control cycle or a next control cycle prevents any collision avoidance trajectory associated with any individual actuator from being achieved. As used herein, "any collision avoidance trajectory" may refer to any trajectory that may be implemented by any robot actuator to avoid a collision without potentially damaging the robot (e.g., without hard braking or performing some other sudden movement/rotation that violates kinematic constraints of the robot). In some implementations, the system may project a future motion state based on an assumption that a next set of trajectories received in the next control cycle will be consistent (e.g., maintain actuator trajectories) with the target motion state achieved when the actuators implement the already-received trajectories (which can be for the current control cycle or the next control cycle). The system may then determine whether a collision avoidance trajectory is not achievable by the actuators in the projected future motion state.

If the answer at block 612 is no, then method 600 may proceed to block 614. At block 614, the system may determine and persist, e.g., in robot memory or elsewhere, new collision avoidance trajectories that are achievable from a future motion state that would result from implementation of the trajectories received at block 608. As noted above, in some implementations, the collision avoidance trajectories may include safe stopping trajectories for the robot actuators. However, in some situations, one or more of the actuators may, in a current motion state, be moving/rotating at a velocity and/or acceleration that is determined, e.g., based on kinematic constraints of the robot and/or its actuators, to be too great to simply stop immediately (e.g., because doing so may damage one or more robot components). In such a situation, safe stopping trajectories may be calculated that would cause the actuators to decelerate at a rate deemed safe given the actuators' kinematic constraints. In other implementations, the collision avoidance trajectories may be generated to cause the robot to return to some previous configuration, such as a starting configuration of the robot or a previous configuration in which an end effector reference point is located at a predetermined position. In yet other implementations, safe stopping trajectories may be implemented first, and then the robot may transition to another configuration, such as back to its starting configuration or a known safe configuration (e.g., at a predetermined distance from any obstacles), and then begin operating based on the robot instructions once again. In yet other implementations, the safe stopping trajectories may be implemented, and then human intervention may be solicited.

At block 616, the system may then provide the trajectories (or other data indicative thereof, such as individual actuator control commands and/or signals translated therefrom) received at block 608 for operating the robot actuators in the current control cycle or the next control cycle. The robot actuators may implement the trajectories to transition the robot to a new configuration.

If the answer at block 612 is yes, then method 600 may proceed to block 618. At block 618, the system may provide collision avoidance trajectories (or other data indicative thereof, such as individual actuator control commands and/or signals translated therefrom) for operating the robot actuators in the current control cycle or the next control cycle. In some implementations, these collision avoidance trajectories may be persisted from a previous control cycle (e.g., block 614). The actuators may then implement the collision avoidance trajectories to cause the robot to avoid the collision, e.g., by safely stopping and/or transitioning the robot to a known safe configuration.

In various implementations, another method similar to method 600 may include: receiving, by one or more processors, robot instructions to be performed by a robot; determining, by one or more of the processors, for each iteration of a sequence of motion states traversed by one or more actuators of the robot based on the robot instructions, collision avoidance trajectories achievable by actuators of the robot from a future motion state; while the one or more actuators of the robot are in a given motion state of the sequence of motion states, determining, by one or more of the processors, that collision avoidance trajectories are not achievable by the actuators in a future iteration of the sequence of motion states; and operating, by one or more of the processors, the robot to implement a collision avoidance trajectory associated with the given motion state in response to determining that the collision avoidance trajectories are not achievable in the future iteration.

Figure 7A:
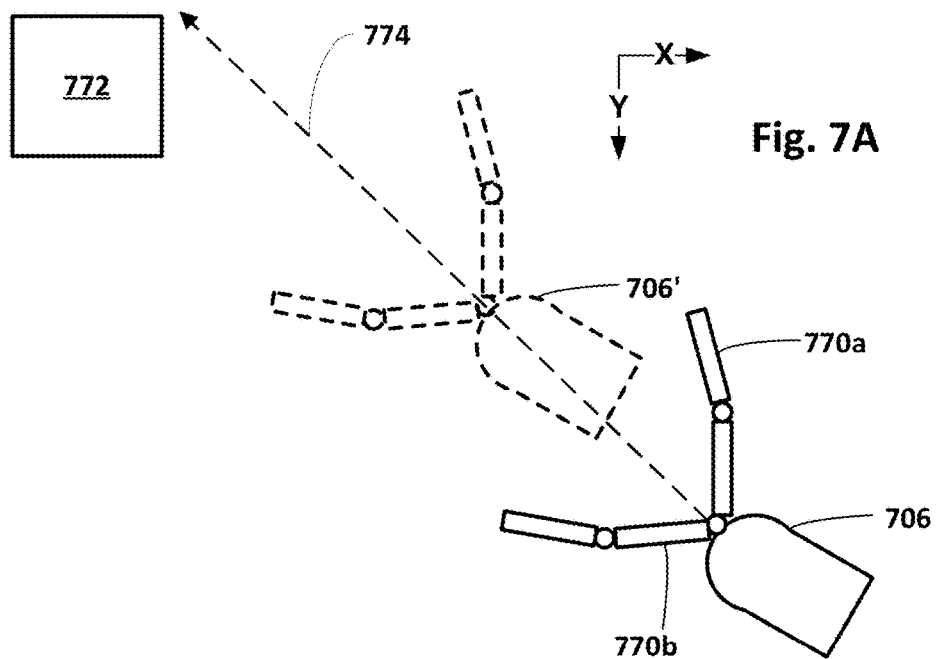
FIGS. 7A and 7B demonstrate an example scenario in which disclosed techniques may be employed, in accordance with various implementations.
Figure 7B:
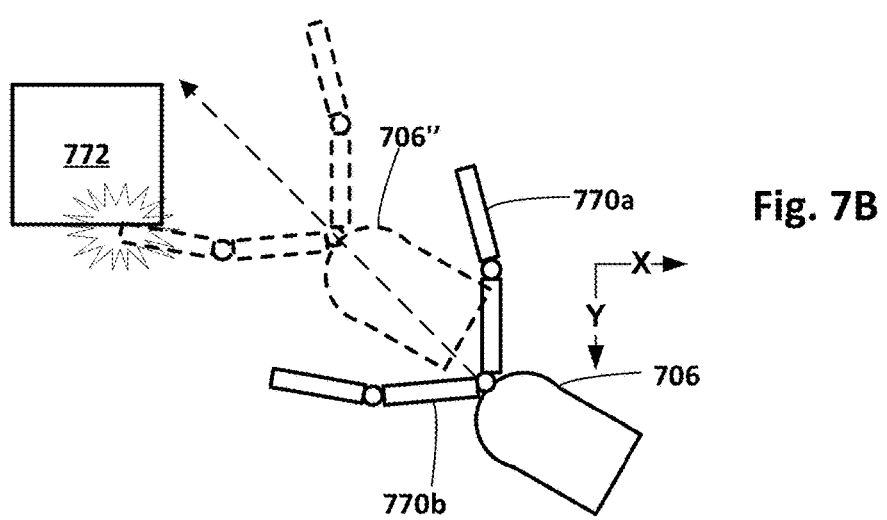

FIGS. 7A-B depict an example scenario in which disclosed techniques may be employed to avoid a robot collision, in accordance with various implementations. A robot end effector 706 in the form of a gripping claw with two appendages, 770a and 770b, is attached to an undepicted robot. The environment in which the end effector 706 is being operated includes an object 772, which may be real or simulated. FIG. 7A depicts end effector 706 during a first control cycle, and FIG. 7B depicts end effector 706 in a subsequent control cycle, such as the next control cycle.

Suppose robot instructions provided to the robot are meant to cause end effector 706 to move along the path 774. More particularly, suppose that the current trajectories of the control cycle in FIG. 7A include control commands to cause actuators (mostly not depicted) of the robot to collectively move end effector 706 along path 774. In FIG. 7A, a future motion state of end effector 706 is projected, e.g., based on trajectories to be implemented and/or a current motion state, and is represented by a projected end effector 706' rendered in dashed lines. As noted above, this projection may assume that robot actuator trajectories received prior to the control cycle that lead to the end effector configuration in FIG. 7A will be maintained. While projected end effector 706' will approach object 772 in the future motion state, there is still sufficient space between projected end effector 706' and object 772 for actuators of the robot to implement a safe stopping trajectory to stop movement of end effector 706 before it collides with object 772.

At a subsequent control cycle depicted in FIG. 7B, end effector 706 has progressed along path 774 so that it is now at the position of projected end effector 706' in FIG. 7A. Another future motion state of end effector 706 is projected, e.g., based on the actuator trajectories associated with the previous control cycle (i.e., that of FIG. 7A) and/or trajectories to be implemented, and is represented by a projected end effector 706" rendered in FIG. 7B using dashed lines. As noted above, this projection may assume that the same robot actuator trajectories as received in FIG. 7A will be maintained. It can be determined, e.g., by collision avoidance trajectory planning engine 520, that in the future motion state, an appendage 770b of projected end effector 706" collides with object 772. In other words, assuming the robot actuators maintain the same trajectories to lead end effector 706 to the future motion state represented by 706", at least one safe stopping trajectory associated with at least one robot actuator is prevented. Accordingly, in various implementations, safe stopping trajectories associated with (e.g., determined during) the control cycle of FIG. 7A may be implemented by the robot actuators, bringing end effector 706 to a stop in a safe manner (e.g., within kinematic constraints of the robot) without colliding with object 772.

Figure 8:
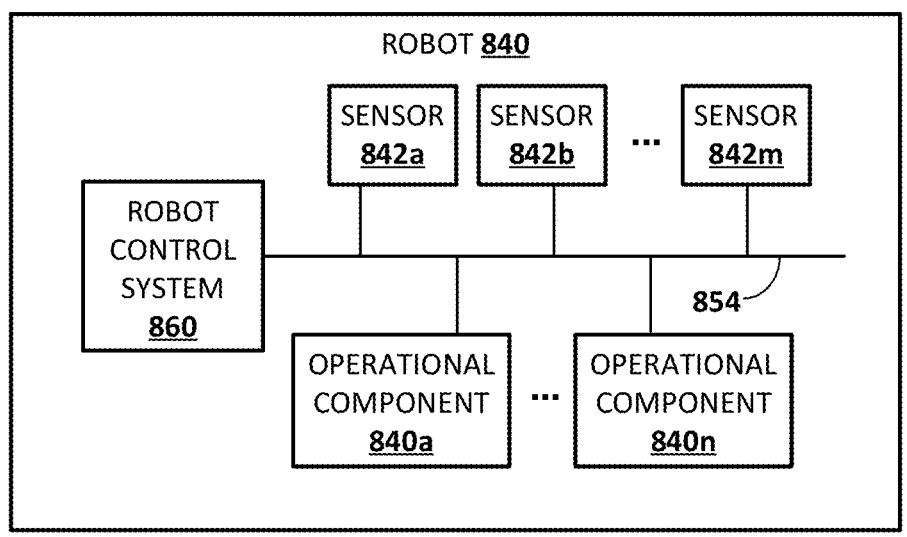
FIG. 8 schematically depicts an example architecture of a robot.

FIG. 8 schematically depicts an example architecture of a robot 840. The robot 840 includes a robot control system 860, one or more operational components 840a-840n, and one or more sensors 842a-842m. The sensors 842a-842m may include, for example, vision sensors, light sensors, pressure sensors, pressure wave sensors (e.g., microphones), proximity sensors, accelerometers, gyroscopes, thermometers, barometers, and so forth. While sensors 842a-m are depicted as being integral with robot 820, this is not meant to be limiting. In some implementations, sensors 842*a-m* may be located external to robot 820, e.g., as standalone units.

Operational components 840*a*-840*n* may include, for example, one or more end effectors and/or one or more servo motors or other actuators to effectuate movement of one or more components of the robot. For example, the robot 820 may have multiple degrees of freedom and each of the actuators may control actuation of the robot 820 within one or more of the degrees of freedom responsive to control commands (e.g., generated from trajectories provided by trajectory generator 586). As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 860 may be implemented in one or more processors, such as a CPU, GPU, and/or other controller(s) of the robot 820. In some implementations, the robot 820 may comprise a "brain box" that may include all or aspects of the control system 860. For example, the brain box may provide real time bursts of data to the operational components 840*a-n*, with each of the real time bursts comprising a set of one or more control commands that dictate, inter alia, the parameters of motion (if any) for each of one or more of the operational components 840*a-n*. In some implementations, the robot control system 860 may perform one or more aspects of methods 400 and/or 600 described herein.

As described herein, in some implementations all or aspects of the control commands generated by control system 860 during a given time period may be based on robot instructions of a request that is being processed by the robot 840 at that time period. For example, the control system 860 may generate control commands based on robot instructions of an active request, or a compilation of those robot instructions. Although control system 860 is illustrated in FIG. 8 as an integral part of the robot 820, in some implementations, all or aspects of the control system 860 may be implemented in a component that is separate from, but in communication with, robot 820. For example, all or aspects of control system 860 may be implemented on one or more computing devices that are in wired and/or wireless communication with the robot 820, such as computing device 910.

Figure 9:
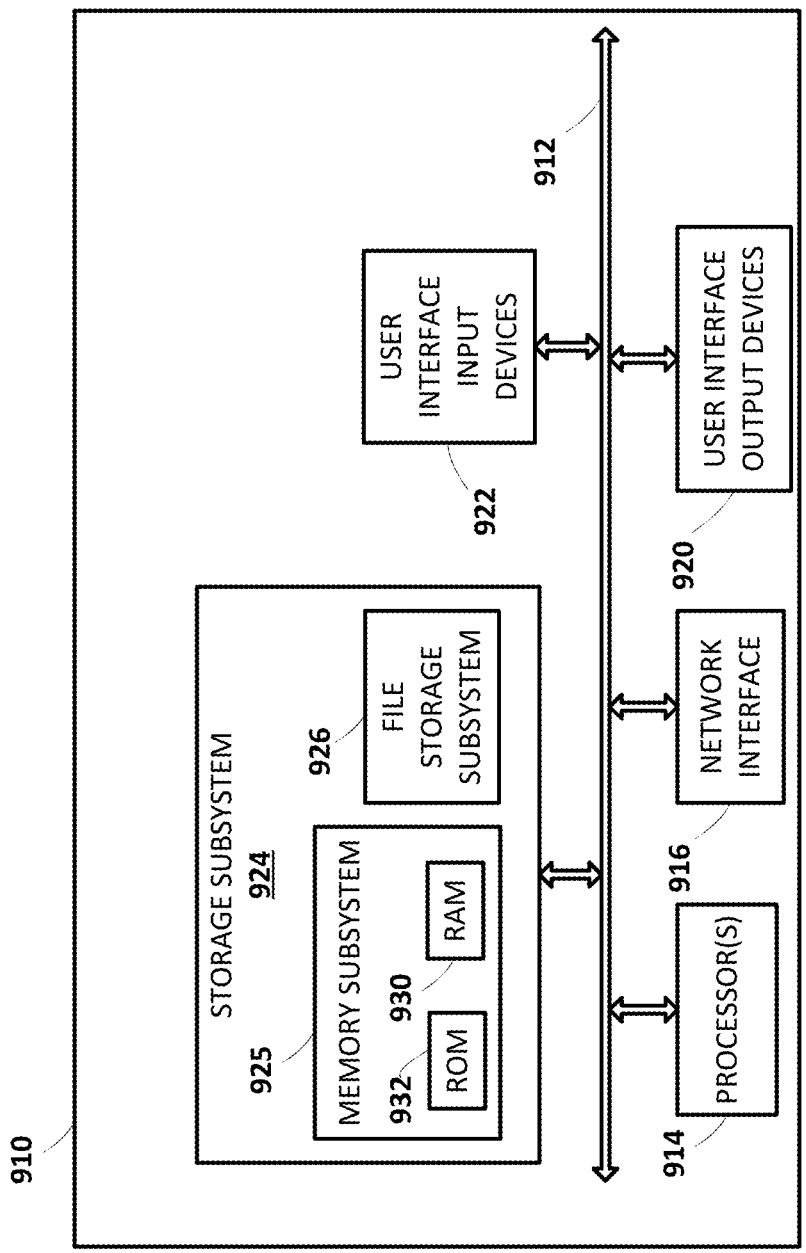
FIG. 9 schematically depicts an example architecture of a computer system.

FIG. 9 is a block diagram of an example computing device 910 that may optionally be utilized to perform one or more aspects of techniques described herein. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the method of FIGS. 4 and/or 5.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for learning a robot's capabilities comprising:
receiving robot instructions to be performed by the robot, wherein the robot instructions are randomly generated to cause the robot to perform random movements;
at each of a plurality of control cycles of one or more processors of the robot:
receiving trajectories to be implemented by actuators of the robot, wherein the trajectories define motion states for the actuators of the robot during the control cycle or a next control cycle, and wherein the trajectories are generated based on the robot instructions;
determining, based on a current motion state of the actuators and the trajectories to be implemented, whether implementation of the trajectories by the actuators prevents any collision avoidance trajectory of a plurality of collision avoidance trajectories calculated for the actuators during an immediately preceding control cycle from being achieved;
when implementation of the trajectories by the actuators does not prevent any collision avoidance trajectory from being achieved, providing the trajectories for operating the actuators of the robot during the control cycle or the next control cycle;
when implementation of the trajectories prevents any collision avoidance trajectory from being achieved, providing the plurality of collision avoidance trajectories for operating the actuators of the robot during the control cycle or the next control cycle, without implementing the trajectories;
operating the actuators of the robot during the control cycle or the next control cycle based on the trajectories or the collision avoidance trajectories to generate data; and
training a machine learning model used to control the robot based on the data generated during the operating.

2. The method of claim 1, wherein determining whether implementation of the trajectories prevents any collision avoidance trajectories from being achieved is based on projecting one or more future motion states of the actuators based on the current motion state.

3. The method of claim 1, wherein receiving the trajectories includes receiving, during the control cycle, trajectories to be implemented by the actuators during the next control cycle.

4. The method of claim 1, wherein the trajectories are generated based on output of a neural network model.

5. The method of claim 1, wherein the collision avoidance trajectories comprise safe stopping trajectories achievable by the actuators of the robot.

6. The method of claim 1, further comprising receiving environmental parameters that indicate one or more properties of environmental objects that are external to the robot, wherein determining whether implementation of the trajectories by the actuators prevents any collision avoidance trajectories from being achieved is based on the environmental parameters.

7. The method of claim 1, wherein the robot is a one of a plurality of robots, the method further comprising:
operating each of the plurality of robots based on the robot instructions;
storing, in one or more computer readable media, data generated by the plurality of robots during the operation of the plurality of robots based on the robot instructions; and
providing at least some of the data or additional data generated based on the data.

8. The method of claim 7, wherein the data generated by the plurality of robots includes data indicative of one or more determinations that collision avoidance trajectories were provided for operating actuators of one or more of the plurality of robots.

9. The method of claim 8, wherein the additional data generated based on the data comprises updated robot instructions.

10. The method of claim 7, further comprising:
configuring a simulated operating space of a robot simulator based on received environmental parameters;
operating the robot simulator based on the robot instructions with the simulated operating space configured based on the received environmental parameters; and
storing, in one or more of the computer readable media, simulated data generated by the robot simulator during the operation of the robot simulator based on the robot instructions;
wherein providing at least some of the data further comprises providing at least some of the simulated data or the additional data further based on the simulated data.

11. A system comprising one or more processors and memory operably coupled with the one or more processors, wherein the memory stores instructions that, in response to execution of the one or more processors, cause the one or more processors to:
receive robot instructions to be performed by a robot, wherein the robot instructions are randomly generated to cause the robot to perform random movements;
at each of a plurality of control cycles of one or more processors of the robot:
receive trajectories to be implemented by actuators of the robot, wherein the trajectories define motion states for the actuators of the robot during the control cycle or a next control cycle, and wherein the trajectories are generated based on the robot instructions;
determine, based on a current motion state of the actuators and the trajectories to be implemented, whether implementation of the trajectories by the actuators prevents any collision avoidance trajectory of a plurality of collision avoidance trajectories calculated for the actuators during an immediately preceding control cycle from being achieved;
when implementation of the trajectories by the actuators does not prevent any collision avoidance trajectory from being achieved, provide the trajectories for operating the actuators of the robot during the control cycle or the next control cycle;
when implementation of the trajectories prevents any collision avoidance trajectory from being achieved, provide collision avoidance trajectories for operating the actuators of the robot during the control cycle or the next control cycle, without implementing the trajectories;

operate the actuators of the robot during the control cycle or the next control cycle based on the trajectories or the collision avoidance trajectories to generate data; and train a machine learning model used to control the robot based on the data generated during the operating.

12. The system of claim 11, wherein the determination of whether implementation of the trajectories prevents any collision avoidance trajectories from being achieved is based on a projection of one or more future motion states of the actuators during one or more future control cycles.

13. The system of claim 11, wherein the instructions include instructions to receive trajectories to be implemented by the actuators during the next control cycle during the current control cycle.

14. A method comprising:

receiving, by one or more processors, robot instructions to be performed by a robot, wherein the robot instructions are randomly generated to cause the robot to perform random movements;

determining, by one or more of the processors, for each iteration of a sequence of motion states traversed by one or more actuators of the robot based on the robot instructions, collision avoidance trajectories achievable by actuators of the robot from a future motion state;

while the one or more actuators of the robot are in a given motion state of the sequence of motion states, determining, by one or more of the processors, that collision avoidance trajectories of a plurality of collision avoidance trajectories calculated for the actuators during an immediately preceding control cycle are not achievable by the actuators in a future iteration of the sequence of motion states;

operating, by one or more of the processors, the robot to implement a collision avoidance trajectory associated with the given motion state in response to determining that the collision avoidance trajectories are not achievable in the future iteration, wherein the operating causes data to be generated; and training a machine learning model used to control the robot based on the data generated during the operating.

15. The method of claim 14, wherein the collision avoidance trajectories comprise safe stopping trajectories achievable by the actuators of the robot.

16. The method of claim 14, further comprising projecting, by one or more of the processors, for each iteration of the sequence of motion states traversed by the one or more actuators of the robot based on the robot instructions, based on a current motion state and one or more instructions of the robot instructions, the future motion state of the one or more actuators.

* * * * *